United States Patent
Aloisio et al.

(10) Patent No.: US 11,652,839 B1
(45) Date of Patent: May 16, 2023

(54) AVIATION SYSTEM ASSESSMENT PLATFORM FOR SYSTEM-LEVEL SECURITY AND SAFETY

(71) Applicant: Architecture Technology Corporation, Minneapolis, MN (US)

(72) Inventors: Scott Aloisio, Willseyville, NY (US); Robert A. Joyce, Ithaca, NY (US); Kenneth McVearry, Dewitt, NY (US); Mark E. Peters, Newport News, VA (US)

(73) Assignee: ARCHITECTURE TECHNOLOGY CORPORATION, Minneapolis, MN (US)

( * ) Notice: Subject to any disclaimer, the term of this patent is extended or adjusted under 35 U.S.C. 154(b) by 1005 days.

(21) Appl. No.: 16/401,592

(22) Filed: May 2, 2019

(51) Int. Cl.
   *G06F 21/57* (2013.01)
   *H04L 9/40* (2022.01)
   *G06F 21/55* (2013.01)

(52) U.S. Cl.
   CPC ........ *H04L 63/1433* (2013.01); *G06F 21/552* (2013.01); *G06F 21/577* (2013.01); *H04L 63/1408* (2013.01); *H04L 63/1416* (2013.01); *H04L 63/1441* (2013.01); *G06F 2221/034* (2013.01)

(58) Field of Classification Search
   CPC ........ G06F 21/55; G06F 21/552; G06F 21/57; G06F 21/577
   See application file for complete search history.

(56) References Cited

U.S. PATENT DOCUMENTS

| | | | |
|---|---|---|---|
| 8,229,785 B2 * | 7/2012 | Fung | G06Q 10/06 |
| 9,369,484 B1 * | 6/2016 | Lacerte | H04L 63/1416 |
| 11,194,901 B2 * | 12/2021 | El-Moussa | H04L 41/142 |
| 11,444,965 B2 * | 9/2022 | Rousse | G06F 21/554 |
| 2003/0093720 A1 * | 5/2003 | Miyao | G06F 11/3447 717/124 |
| 2004/0168173 A1 * | 8/2004 | Cohen | G06F 21/55 719/310 |
| 2005/0138413 A1 * | 6/2005 | Lippmann | H04L 63/1433 726/4 |
| 2009/0113552 A1 * | 4/2009 | Jin | G06F 21/577 726/25 |

(Continued)

OTHER PUBLICATIONS

U.S. Department of Commerce, "Security and Privacy Controls for Federal Information Systems and Organizations," NIST, Revision 4, Special Publication 800-53, accessed from http://dx.doi.org/10.6028/NIST.SP.800-553r4, Apr. 2013, updated revision Jan. 22, 2015, 462 pp.

*Primary Examiner* — Khang Do

(74) *Attorney, Agent, or Firm* — Shumaker & Sieffert, P.A.

(57) ABSTRACT

An attack tree model for an aviation system comprises a plurality of tree nodes organized as a tree. For each tree node of the attack tree model model, the tree node corresponds to a respective event that may befall aviation system. An analysis computing system generates one or more attack tree models for the aviation system, wherein the aviation system includes one or more systems, sub-systems, or components. The analysis computing system further performs an assessment of one or more of the system, sub-systems, or components of the aviation system using the one or more attack tree models, and outputs metrics indicative of the assessment.

20 Claims, 14 Drawing Sheets

(56) References Cited

U.S. PATENT DOCUMENTS

| | | | | |
|---|---|---|---|---|
| 2010/0058456 | A1* | 3/2010 | Jajodia | G06F 21/552 726/11 |
| 2010/0153156 | A1* | 6/2010 | Guinta | G06Q 10/0635 706/54 |
| 2010/0325412 | A1* | 12/2010 | Norrman | G06Q 10/06 726/25 |
| 2013/0055404 | A1* | 2/2013 | Khalili | G06Q 10/06312 726/25 |
| 2014/0013431 | A1* | 1/2014 | Bush | G06F 21/00 726/23 |
| 2014/0380485 | A1* | 12/2014 | Ayyagari | G06F 21/577 726/25 |
| 2015/0269383 | A1* | 9/2015 | Lang | G06F 21/604 726/1 |
| 2017/0019421 | A1* | 1/2017 | Hebert | G06F 21/577 |
| 2017/0054752 | A1* | 2/2017 | Nguyen | H04L 63/1491 |
| 2017/0134400 | A1* | 5/2017 | Nguyen | H04L 63/1416 |
| 2018/0075243 | A1* | 3/2018 | Thomas | G06F 30/20 |
| 2018/0157831 | A1* | 6/2018 | Abbaszadeh | G06F 21/552 |
| 2018/0157838 | A1* | 6/2018 | Bushey | H04L 63/1483 |
| 2018/0309779 | A1* | 10/2018 | Benyo | G06F 21/56 |
| 2018/0367563 | A1* | 12/2018 | Pfleger de Aguiar | H04L 41/12 |
| 2019/0222593 | A1* | 7/2019 | Craig | H04L 63/1433 |
| 2019/0260768 | A1* | 8/2019 | Mestha | H04L 63/1416 |
| 2020/0067962 | A1* | 2/2020 | Tan | G06N 5/02 |
| 2020/0104492 | A1* | 4/2020 | Boulton | G06F 21/577 |
| 2020/0104497 | A1* | 4/2020 | Crouch | G06F 21/76 |
| 2020/0137084 | A1* | 4/2020 | Roy | H04L 63/101 |
| 2020/0394302 | A1* | 12/2020 | Nashimoto | G01P 21/00 |
| 2021/0089647 | A1* | 3/2021 | Suwad | G06F 21/552 |
| 2021/0211442 | A1* | 7/2021 | Haga | H04L 63/1425 |

* cited by examiner

AVIATION SYSTEM ASSESSMENT PLATFORM FOR SYSTEM-LEVEL SECURITY AND SAFETY

STATEMENT REGARDING FEDERALLY SPONSORED RESEARCH OR DEVELOPMENT

This invention was made with Government support under Contract 80NSSC18P1934 with the United States Department of Defense. The Government may have certain rights in this invention.

TECHNICAL FIELD

This disclosure relates to system-level security analysis.

BACKGROUND

A heterogeneous distributed computing system, such as a large modeling and simulation (M&S) system, may include multiple types of devices. For example, an M&S system may comprise network-enabled sensors, server computing devices, end-user devices, firewall devices, intrusion detection systems, and so on. Furthermore, due to accelerating computing demands of M&S systems, there is growing interest in using specialized hardware solutions in M&S tasks. Field programmable gate arrays (FPGAs), graphical processing units (GPUs), distributed computing, real-time processing, and hardware-in-the-loop tasks have resulted in faster and more accurate simulations. The devices of a heterogeneous distributed computing system may be distributed geographically.

Another example of a heterogenous distributed computing system includes the various systems, sub-systems and components used in modern aircraft. Modern aircraft systems have evolved towards integrated modular computing architectures that are linked to multiple external networks. These developments have introduced cyber-attack vulnerabilities which did not exist in older-generation avionics systems. While aviation safety assessment and risk mitigation methods for traditional hazards are well established, on-board cybersecurity risks are new to aviation and the community has been slow to respond to the potential hazard.

The potentially large numbers and diverse types of devices, system, sub-systems, and components in an aviation system may be necessary to allowing the aviation system perform a desired role. However, the numbers and types of devices in an aviation system may increase the difficulty administrators face in preventing, diagnosing, and correcting faults, errors, misconfigurations, security breaches, downtime, and other adverse events that may befall the aviation system. For instance, a wide heterogeneous array of hardware components with varying degrees of connectivity may prevent use of many conventional approaches to health and status monitoring of aviation system.

Managing and monitoring aviation systems may be further complicated by the security requirements of aviation systems. For example, in some instances, security credentials for gathering status information remotely is preferably secure and private. Additionally, in some instances, connecting and querying a collection of system, sub-systems, nodes and/or components may be difficult without many layers of abstraction and treating individual nodes as isolated entities may increase management overhead. In some instances, security policies may even restrict certain avenues for status information collection, prohibiting remote shell access or supporting components that are outside of administrative control.

SUMMARY

This disclosure describes devices, methods, and techniques for monitoring, assessing, visualizing, and analyzing potential risks, adverse events, and security of an aviation system. To counter emerging threats and increased vulnerabilities, the disclosure describes devices, methods, and techniques that provide an ability to comprehensively and systematically assess aviation system-level cybersecurity risks. The techniques of this disclosure support assessment of risks in the design of new aircraft systems as well as devices and techniques that can support inspections on an airframe-by-airframe basis.

In one example, the assessment techniques of this disclosure may output a principled, machine-readable record of both manual and automated risk assessment (including cybersecurity risk) procedures and results for individual systems, sub-systems, and/or components of an overall aviation system. The assessment techniques of this disclosure may include computing component and sub-system level metrics, as well as computing system-level metrics that include the results of assessments of multiple sub-systems and/or components. The techniques and devices of this disclosure facilitate re-evaluation throughout the lifecycle of an aviation system.

In some example of the disclosure, a computing system may be configured to aggregate individual component/sub-system/system results into a larger attack model, which can be used to assess system-level risk. The techniques of this disclosure can be used in both a development and maintenance capacity. For example, during the development of a new avionics component under a Supplemental Type Certificate (STC), the developing organization could test the component for vulnerabilities using the devices techniques of this disclosure. In a maintenance capacity, an AMT (Aviation Maintenance Technician) might use the devices and techniques of this disclosure to verify that an avionics installation or update on a particular airframe has not introduced any cyber-vulnerabilities.

As described herein, attack tree models are used to model potential adverse events for various systems, sub-systems, and components of an aviation system. For each respective tree node of an attack tree model, the respective tree node corresponds to a respective event that may befall the aviation system. For each respective non-leaf tree node of the attack tree model, the events corresponding to child tree nodes of the respective non-leaf tree node are preconditions of the event corresponding to the respective non-leaf tree node. Furthermore, test agents are associated with various tree nodes of the risk model. A test agent associated with a tree node may perform, according to a predefined recurrence pattern, a data gathering routine that gathers data from a target (asset). In this disclosure, the terms target and asset may be used interchangeably. The target may comprise one or more target nodes or asset nodes, such as systems, sub-systems, and/or components in the aviation system. In some instances, the data gathered by the data gathering routine may indicate whether the event corresponding to the tree node in the attack tree model is occurring, has occurred, or will occur. In some instances, the data gathered by the data gathering routine may indicate whether the event corresponding to the tree node can occur. In this way, the techniques of this disclosure may generate a record of fallibility based on an attack tree model with associated automated tests. Furthermore, an analysis computing system may output a graphical representation of the data for display.

In one example, this disclosure describes an apparatus configured to analyze aviation system-level security. The apparatus comprises a memory configured to store data, an interface communicatively coupled to the memory, the interface configured to communicatively couple the apparatus to an aviation system, and processing circuitry communicatively coupled to the memory and the interface. The processing circuitry is configured to generate one or more attack tree models for the aviation system, wherein the aviation system includes one or more systems, sub-systems, or components, perform an assessment of one or more of the system, sub-systems, or components of the aviation system using the one or more attack tree models, and output, to the memory, metrics indicative of the assessment.

In another example, this disclosure describes a method of analyzing aviation system-level security, the method comprising generating one or more attack tree models for an aviation system, wherein the aviation system includes one or more systems, sub-systems, or components, performing an assessment of one or more of the system, sub-systems, or components of the aviation system using the one or more attack tree models, and outputting metrics indicative of the assessment.

In another example, this disclosure describes a non-transitory computer-readable storage medium storing instructions that, when executed, cause one or more processors to generate one or more attack tree models for the aviation system, wherein the aviation system includes one or more systems, sub-systems, and components, perform an assessment of one or more of the system, sub-systems, or components of the aviation system using the one or more attack tree models, and output metrics indicative of the assessment.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIG. 4 is an example of a dashboard interface, in accordance with one or more aspects of this disclosure.

DETAILED DESCRIPTION

Figure 1:
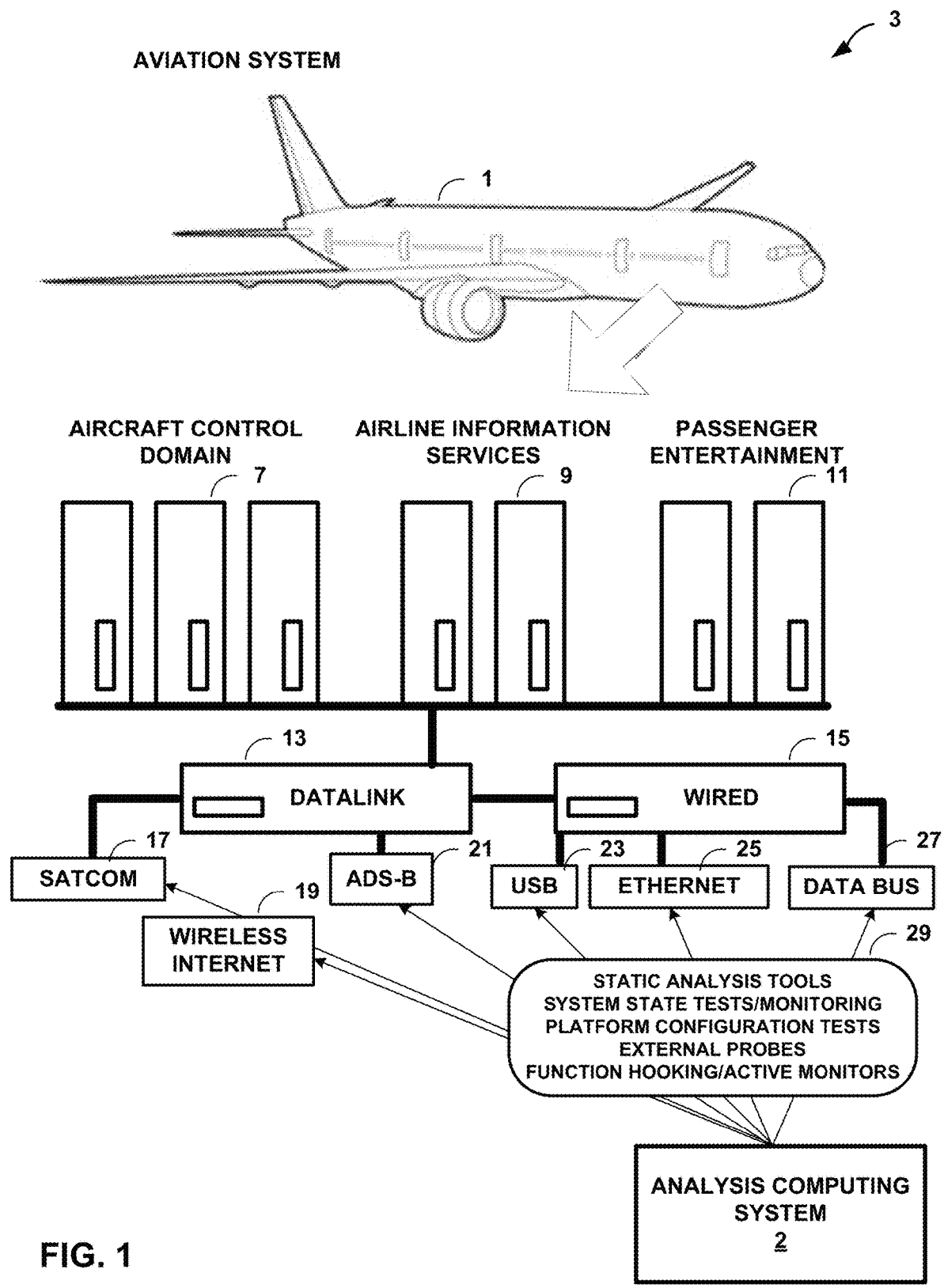
FIG. 1 is a system-level diagram illustrating an example operating environment of an example analysis computing system for an aviation system, in accordance with one or more aspects of the present disclosure.

FIG. 1 is a system-level diagram illustrating an example operating environment of an example analysis computing system configured to perform a security assessment of an aviation system in accordance with one or more aspects of the present disclosure. As shown in FIG. 1, analysis computing system 2 may be configured to perform one or more assessments 29 on aviation system 3. Aviation system 3 may include a plurality of systems, including sub-systems and components of such systems, of aircraft 1. Aircraft 1 may be any type of aircraft, including passenger aircraft, civil aircraft, and/or military aircraft.

Aviation system 3 of aircraft 1 may include a plurality of systems. As shown in FIG. 1, example systems of the overall aviation system 3 may include an aircraft control domain (ACD) system 7, an airline information services (AIS) system 9, and a passenger entertainment system (PES) 11. Of course, more or fewer systems may be present on any given aircraft 1. In general, aircraft control domain system 7 may include a plurality of sub-systems, components, and communication networks used to monitor and control the flight of aircraft 1. Aircraft control domain system 7 may include sensors, gauges, flight deck displays, and flight control mechanisms used to aircraft crew ACD system 7 may include sub-systems and components that connect aircraft 1 to air traffic control (ATC) and some aircraft operational control (AOC) communication. Such air-ground communication links may be accomplished through one or more datalinks 13. Examples of datalinks 13 include satellite communication (SATCOM) link 17 and automatic dependent surveillance-broadcast (ADS-B) link 21. However, any type of datalink may be used. ACD system 7 may also provide services and connectivity between other systems of aviation system 3, such as AIS system 9, and PES 11 through other communication links of datalinks 13 or wired links 15. Examples of other communication links may include a wireless Internet link 19 (e.g., Wi-Fi), universal serial bus (USB) 23, Ethernet link 25, and/or data bus 27. In some examples, AIS system 9 may be configured to provide a security perimeter incorporating network routing and security functions and services between AIS system 9 and less critical domains and any connected wireless networks (e.g., wireless Internet 19).

In some examples, ACD system 7 may impose requirements on lower-criticality domains (e.g., AIS system 9 or PES 11), but may not rely on them. In general, sub-systems within the ACD system 7 are configured in such a way to protect operation from interference. Off-board communications for the ACD aligns with the safety-related characteristics of the domain in general. ATC and some AOC communications are considered high priority and other uses are based on non-interference with high-priority usage. In some examples, ACD system 7 off-board communication links are typically either analog or non-IP digital. However, an off-board IP link may be a reasonable possibility in future airborne network architecture.

In some examples, ACD system 7 can be divided into two general sub-systems. A first sub-system may be called a Flight and Embedded Control System sub-system. Components of the Flight and Embedded Control System sub-system control the operation of aircraft 1 from the flight-deck. A second sub-system may be called the Cabin Core sub-system, which provides environmental functions dedicated to cabin operations, such as environmental control, passenger address, smoke detection, etc.

AIS system 9 may be configured to provide services and connectivity between independent aircraft domains such as avionics, in-flight entertainment, cabin distribution and any connected off-board networks. AIS system 9 provides a security perimeter, incorporating network routing and security functions or services between AIS system 9 and less critical domains and any connected wireless networks. In some examples, other domains may impose requirements on lower-criticality domains, but cannot rely on them. In general, sub-systems within AIS system 9 should protect themselves from other domains and networks.

AIS system 9 provides general purpose routing, computing, data storage and communications services for non-essential applications. AIS system 9 may include one or more computing platforms for third party applications and content. AIS system 9 may include platforms that may be used to support applications and content for either cabin or flight crew use. In some examples, AIS system 9 can be subdivided into two sub-systems. A first sub-system may be called an Administrative sub-system, which provides operational and airline administrative information to both the flight deck and cabin. A second sub-system may be called a Passenger Support sub-system, which provides information to support the passengers.

PES 11 may be characterized by the need to provide passenger entertainment and network services. An analogy used many times is that the airline passenger should be able to enjoy the same services as being in a hotel room. The functionality of this domain is the most dynamic in that passenger demands follow the rapid progress of the commercial home and office markets.

PES 11 may be configured to include more than traditional in-flight entertainment (IFE) systems. For example, PES 11 may include any device or function of a device that provides services to passengers. PES 11 may contain multiple sub-systems from different vendors which may or may not be interconnected to one another, and the borders of PES 11 (e.g., in terms of connectivity) may not necessarily follow physical device borders. Beyond traditional IFE systems, PES 11 may also include passenger device connectivity systems, Passenger Flight Information Systems (PFIS), broadband television or connectivity systems, seat actuator or message system and controls, and functions of an information server device providing services to passengers via the IFE devices.

The integrated modular computing architecture of modern flight decks, along with multiple network access, introduces the potential for unauthorized remote access. One example of a modular computing architecture is the Integrated Modular Avionics (IMA) architecture. The IMA architecture has become the standard architecture for modern transport avionics since the introduction of the Airplane Information Management System (AIMS) system on the Boeing 777 aircraft. Modular computing architectures save space and weight by hosting multiple avionics processes in a centralized computing architecture. Numerous processes that were once hosted on separate special-purpose hardware are now hosted on a small number of integrated computing modules. The physical separation that existed in legacy systems is often gone, and such physical separation has been replaced by virtualized partitions using sophisticated operating systems.

To compound the problem, modern avionics interface with multiple external networks and devices. Modern aircraft support satellite data links (e.g., Aircraft Communications Addressing and Reporting System (ACARS)), in-flight wireless internet 19, Electronic Flight Bags (EFB) and ADS-B (Automatic Dependent Surveillance-Broadcast) 21. EFBs, based on COTS (Commercial off-the-shelf) operating systems, may be interfaced directly with the flight deck avionics. IFE and public Wi-Fi (that service passenger-owned devices) give passengers a level of connectivity to computing architecture of aviation system 3 that was previously unavailable. These developments make security risk assessments increasingly beneficial and more complex.

To address the need to counter cyber-security threats to aviation systems, such as aviation system 3, analysis computing system 2 may be configured to execute a hierarchical security modeling and assessment software product tailored to the specific needs of aviation system 3. Analysis computing system 2 is an external system relative to aviation system 3. Analysis computing system 2 may be provided connectivity to the various access points (e.g., data links 13 and/or wired networks 15) of aviation system 3 by a technician.

Analysis computing system 2 may be configured to execute software for maintaining safe and secure system states on avionics and aviation assets through structured modeling of the attack surface and automated testing. A system maintainer, administrator, security engineer, or user, may install create, import, and/or generate an attack tree model for aviation system 3. Once the attack tree model is created, the user may schedule and/or run test procedures on aviation system 3.

Analysis computing system 2 is configured to perform a hierarchical assessment of the vulnerabilities of aviation system 3, including an assessment of communication buses, integrated avionics, and external communication links of the various systems, sub-systems, and components of aviation system 3. Analysis computing system 2 may be configured to models risks using attack tree models, which may be developed to support systematic investigation of attack modalities. Analysis computing system 2 generates and employs attack tree models that may be used at large scales and may be adopted incrementally across distributed systems maintained by separate entities (e.g., the various systems and sub-systems of aviation system 3). The assessments 29 that may be performed by analysis computing system 2 using attack tree models may include the use of static analysis tools, system state tests and monitoring, platform configuration tests, external probes, and/or function hooking and active monitors.

An example static analysis tool may be configured to scan source code in a system, sub-system, or component of aviation system 3. The scan could be configured to detect common software issues (e.g., use of unsafe functions, memory leaks, improper buffer management, etc.).

System state tests and monitoring tools allow analysis computing system 2 to determine if the target (e.g., a system, sub-system, or component of aviation system 3) is operating properly. For example, a system state tests and monitoring tool may send Ping packets to a wireless/ethernet interface to determine if such an interface is still operating.

A platform configuration test may test for certain system configurations (e.g., a wireless Internet configuration). As one example, a platform configuration test may be configured to determine if a particular port is open, is the port using a safe wireless security protocol, etc.

An example external probe may be configured to analyze a system, sub-system, or component of aviation system 3 using an external sensor. For example, weather may impact flight ability, for example, so analysis computing system 2 may be configured to monitor wind sensors, temperature sensors, altitude sensors, etc., for strange anomalies or unsafe values.

Examples of function hooking and active monitors may include any devices that have some kind of diagnostic communication capabilities. The automotive equivalent would be something like a check-engine light and accompanying error code triggering some test procedure to fail. To diagnose the issue, technicians may use analysis computing system 2 to identify possible failure points by looking at the tree model and tracing the path of failure through tree branches.

As described above, each of ACD system 7, AIS system 9, and PES 11of aviation system 3 may be made up of one or more sub-systems. In addition, each sub-system may include a plurality of components (including communication networks). The type of components that can be tested is limited only by the communication interfaces that they use. Any Linux-based computer system can be tested using secure shell (SSH) communication capabilities, as one example. A common example of this is wireless internet gateways. b Avionics-specific hardware interfaces, like diagnostic ports, could be used to gather general diagnostic information. Users could plug diagnostic computers, such as analysis computing system 2, into those ports and probe the system for failures. In other examples, the diagnostic computers could generate a list of issues that could be manually entered into analysis computing system 2. Components with absolutely no communication capabilities can be tested manually in a more traditional way and documented within the analysis computing system 2. This is more labor intensive but makes long-term management easier and clearly ties test procedures to the context of a working system. Non-technical components that are essential to system safety, such as flight staff or air-traffic-controller operators, can be manually assessed and documented as well. As will be described below, analysis computing system 2 may be configured to perform a security assessment on selected systems, sub-systems, and/or components of aviation system 3. The output of such assessment (e.g., metrics of risk) may then be aggregated and presented to a user of analysis computing system 2.

As will be explained in more detail below, analysis computing system 2 may be configured to generate one or more attack tree models for aviation system 3, wherein aviation system 3 may include one or more systems, sub-systems, and components (e.g., ACD system 7, AIS system 9, and/or PES 11). Analysis computing system 2 may be configured to perform an assessment of one or more of the system, sub-systems, or components of aviation system 3 using the one or more attack tree models, and output metrics indicative of the assessment. In this example, analysis computing system 2, may output a representation of the metrics indicating whether an event corresponding to a particular attack tree model may occur. In this way, the analysis computing system 2 allow a user/technician to address a specific problem arising in aviation system 3.

Figure 2:
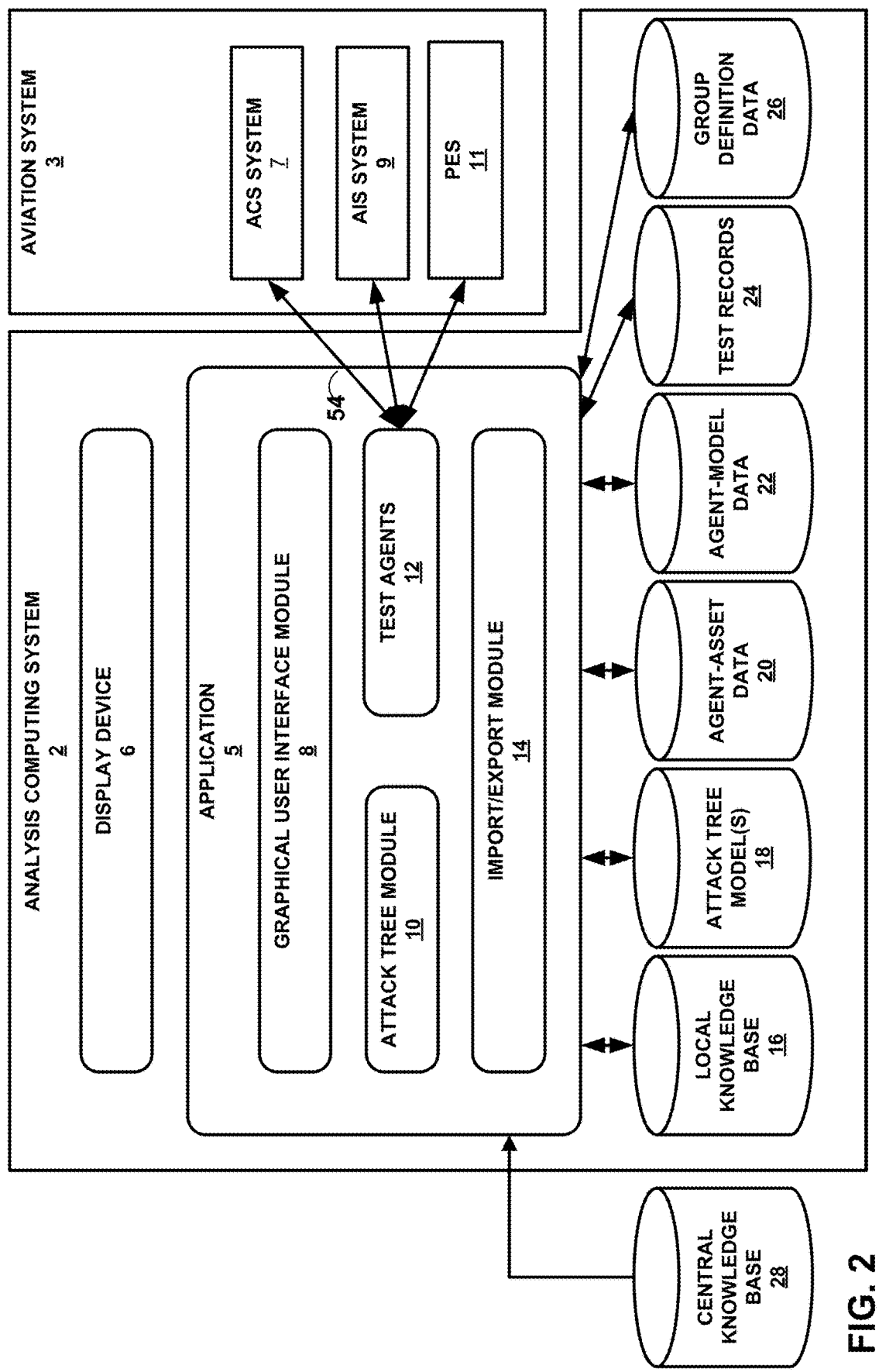
FIG. 2 is a block diagram illustrating an example analysis computing system and an example distributed computing system, in accordance with one or more aspects of the present disclosure.

FIG. 2 is a block diagram illustrating an example analysis computing system 2 and an example aviation system 3, in accordance with one or more aspects of the present disclosure. In some examples, aviation system 3 includes one or more the ACS system 7, AIS system 9, and PES 11. As shown in FIG. 2, analysis computing system 2 is communicatively coupled to one or of ACS system 7, AIS system 9, and/or PES 11 through interfaces 54. Of course, aviation system 3 may include more or fewer systems. In addition, analysis computing system 2 may be configured to be communicatively coupled to individual sub-systems or components of ACS system 7, AIS system 9, and/or PES 11 through interfaces 54. For instance, analysis computing system 2 may be communicatively coupled to aviation system 3 via a communication network, such as the Internet, Ethernet, USB port, or other data buses. Analysis computing system 2 is configured to execute an application 5 in order to analyze operation of one or more systems, sub-systems, and/or components of aviation system 3. Furthermore, in the example of FIG. 2, analysis computing system 2 includes a display device 6 that displays data (e.g., through a graphical user interface).

ACS system 7, AIS system 9, and/or PES 11 may comprise a plurality of systems, sub-systems, and components of aviation system 3. For example, ACS system 7 may include an ATC radio, an ADS-B radio, flight deck avionics, communication links, and so on. In some examples, ACS system 7, AIS system 9, and/or PES 11 may include various processing systems and hardware including server blades, graphical processing units (GPUs), server computers, personal computers, mobile computing devices, application-specific integrated circuits (ASICs), microprocessors, and other types of communication-equipped devices. In some examples, one or more components or sub-systems of ACS system 7, AIS system 9, and/or PES 11 may be implemented as one or more virtual machines. Analysis computing system 2 may comprise one or more computing devices. For example, analysis computing system 2 may comprise one or more personal computers, server computers, server blades, mobile computing devices, or other types of computing devices.

In the example of FIG. 2, application 5 includes graphical user interface (GUI) module 8, attack tree module 10, one or more test agents 12, and import/export module 14. Analysis computing system 2 may further include local knowledge base 16, attack tree model(s) 18, agent-target data 20, agent-model data 22, test records 24, and group definition data 26. Each of local knowledge base 16, attack tree model(s) 18, agent-target data 20, agent-model data 22, test records 24, and group definition data 26 may be stored in a data storage system. The data storage system may comprise one or more storage media, such as hard disks, optical disks, persistent memory units, and so on. In the example of FIG. 2, analysis computing system 2 is also communicatively coupled to central knowledge base 28, which may, in some cases, be remote from and external to analysis computing system 2.

Using analysis computing system 2, an analyst can perform multiple kinds of evaluations provided by attack tree module 10 to generate an overall risk assessment for one or more of the systems, sub-systems, and/or components of aviation system 3. The attack tree models used and/or provided by attack tree module 10 may, in some cases, incorporate design- and run-time evaluation from multiple sources, such as test agents 12.

As shown in FIG. 2, application 5 may receive data from local knowledge base 16 and central knowledge base 28 using import/export module 14. Local knowledge base 16 may be local to, and stored on, analysis computing system 2. Central knowledge base 28 may include data associated with common vulnerabilities to aviation systems and/or known attacks that may be initiated against such systems. Much of the data included in central knowledge base 28 may include vendor- or community-provided data that is updated over time as more information becomes available.

In some instances, the data stored in central knowledge base 28 may also be stored or copied into local knowledge base 16 of analysis computing system 2 via import/export module 14. Local knowledge base 16 may also include policy information associated with rules as to which operations may or may not be performed by a given system, such as one or more systems of aviation system 3. Import/export module 14 may import the information contained in local knowledge base 16 and/or central knowledge base 28, and may provide such information to attack tree module 10 for use in risk modeling and analysis operations.

Attack tree module 10 utilizes the information provided by test agents 12 based on the monitoring and assessment of systems, sub-systems, and/or components of aviation system 3. Using the information provided by import/export module 14 and test agents 12, attack tree module 10 is capable of performing risk modeling and analysis operations to determine whether events are occurring, have occurred, potentially may occur, identify any potential vulnerabilities, risks, or malicious code (e.g., malware) associated with execution of processes in aviation system 3. Attack tree module 10 may utilize graphical user interface module 8 to provide graphical representations, such as graphical representations of metrics of vulnerabilities and risks, within a graphical user interface that is output to a user (e.g., analyst or technician). Based on the output provided by GUI module 8, a user may determine what corrective or preventive actions to take. In some examples, such actions make take place in a development process (e.g., modifying code or configuration information to mitigate or eliminate such vulnerabilities or risks), by updating software, making configuration changes, removing systems, sub-systems, and/or components of aviation system 3, and so on.

In the example of FIG. 2, GUI module 8 outputs GUIs for display on display device 6. Although shown as part of analysis computing system 2, display device 6 may be part of a separate computing system, such as a client computing system. In some examples, GUI module 8 outputs an attack tree model design interface for display. The attack tree model design interface may enable the user to generate an attack tree model, such as attack tree model(s) 18, for aviation system 3. In this context, generating an attack tree model (e.g., one of attack tree model(s) 18) may include automatic generation of an attack tree model based on parameters, manual user generating of an attack tree model, selection of an existing attack tree model, and/or modification of an existing attack tree model. Based on indications of user input received via the attack tree model design interface, attack tree module 10 may generate data representing the attack tree model. In some examples, the data representing the attack tree model is stored as XML data. Attack tree module 10 may configure GUI module 8 to use the data representing attack tree model(s) 18 to output a GUI based on attack model(s) 18.

A top-level attack goal, such as disrupting the operation of a critical system (e.g., ACS system 7), is at the root of the attack tree. The children of an attack goal are subgoals, such as modifying the data during computation or modifying the data in storage. Subgoals may be disjunctive (e.g., one of the subgoals must be met) or conjunctive (e.g., all subgoals must be met). Leaf subgoals are those that might be met because of a vulnerability in the system, a component failure, or a human error. For example, an attacker might break an encryption code protecting passwords, which would then lead to the exposure of sensitive data. The attack tree model effectively illustrates how low-level vulnerabilities can be exploited to achieve the attacker's possible high-level aims. However, analysis computing system 2 is not limited to the use attack tree models. Analysis computing system 2 may be configured to allow users to create constructive hierarchies in the same way.

In accordance with techniques of this disclosure, attack tree model(s) 18 may include a plurality of tree nodes organized as a tree. Each tree node of the tree may correspond to an event that may occur in aviation system 3. For each respective non-leaf tree node of attack tree model(s) 18, the events corresponding to child tree nodes of the respective non-leaf tree node are preconditions of the event corresponding to the respective non-leaf tree node. For example, a particular tree node of attack tree model(s) 18 may correspond to a failure of a certain system, sub-system, and/or component in aviation system 3 to send data. In this example, a first child tree node of the particular tree node may correspond to a system, sub-system, and/or component of aviation system 3 not being powered on; a second child tree node of the particular tree node may correspond to a network interface controller (NIC) of aviation system 3 not being properly configured; a third child tree node of the particular tree node may correspond to there being insufficient bandwidth to send data from a particular component of aviation system 3, and so on.

As described above, the events corresponding to child tree nodes of a given tree node in attack tree model(s) 18 may be conjunctive or disjunctive for the occurrence of the event corresponding to the given tree node. In instances where events corresponding to child tree nodes of the given tree node are conjunctive, all events corresponding to the child tree nodes must be met in order for the event corresponding to the given tree node. For example, an event corresponding to a first child tree node of the given tree node and an event corresponding to a second child tree node of the given tree node may both need to occur for the event corresponding to the given tree node to occur. In instances where events corresponding to child tree nodes of the given tree node are disjunctive, one or more of the events corresponding to the child tree nodes must be met. For example, either an event corresponding to a first child tree node of the given tree node or an event corresponding to a second child tree node of the given tree node may be sufficient for occurrence of the event corresponding to the given tree node.

In some examples, leaf tree nodes may correspond to events that may occur because of a vulnerability in aviation system 3. For example, an attacker might break an encryption code protecting passwords. In this example, an attacker breaking an encryption code protecting passwords may be an event corresponding to a leaf tree node of a risk model. Therefore, the risk model may illustrate how vulnerabilities can lead to possible root-level events, such as how an attacker may exploit a vulnerability to achieve the attacker's possible aims.

In some examples, application 5 may receive data representing all or portions of attack tree model(s) 18 from import/export module 14 or another source. Import/export module 14 may receive such data from another computing device or computer-readable storage media. Moreover, import/export module 14 may export data representing attack tree model(s) 18. In some examples, import/export module 14 may export or import data representing attack tree model(s) 18 using a version control system, such as CVS or SVN. Furthermore, in some examples, GUI module 8 may output, for display, an attack tree model comparison interface for comparing changes in versions of attack tree models. For example, the attack tree model comparison interface may show a vertically split window with an attack tree model hierarchy on either side. In this example, along a window border between a left and right segment, lines may connect differences in attack tree models. Furthermore, in some examples, an unmodified tree has one top level node with the name "ROOT." In this example, the tree is modified to include two additional nodes nested below the ROOT node. The user may be able to look at a split window with the unmodified ROOT tree on the left, and the augmented tree on the right. In this case, the left tree shows a line under ROOT extending to the right tree where the added child nodes are highlighted. This indicates that the left tree is missing child nodes that are present in the updated tree. This type of interface is analogous to a side-by side text "diff", of which there are many existing examples.

In some examples, to automate and simplify the process of generating attack tree model(s) 18, standardized guidelines can be used to outline avenues for events, such as cyberattacks. For instance, application 5 may use established guidance metrics such as NIST Special Publication 800-53, Common Weakness Enumeration (CWE), and the Federal Risk and Authorization Management Program (FedRAMP). Import/export module 14 may import these guidelines, as well as other further guidelines, into a risk model as attack goals, which attack tree module 10 may then test for compliance. In accordance with a technique of this disclosure, application 5 may support security guidelines for enterprise Linux, such as the Red Hat OVAL patch definitions. Additionally, in some examples, application 5 may read architectural documents in the Graphviz dot format. In some examples, the set of supported formats and architectural primitives may be expanded to focus on specification aviation system and avionics needs.

In some examples, system designers and maintainers may start by identifying the system assets that they would like to protect, and then build an attack tree model around possible actions that attackers can take against assets of aviation system 3. Using this guided workflow for security assessment ensures that high value targets are prioritized and that the security perimeter is not penetrated. By offloading structured attack approaches into attack tree models, the techniques of this disclosure add to the overall security posture while often lowering the management overhead involved.

In some examples, application 5 may automatically generate parts of attack tree model(s) 19. For instance, in one example, application 5 may receive data indicating certain sub-systems and/or components in aviation system 3. Similar events may occur to a plurality of the sub-systems and/or components. Hence, application 5 may automatically generate a respective sub-tree of tree nodes for each respective sub-systems and/or components. Each of the generated sub-trees may comprise a respective set of identical tree nodes. Automatically generating sub-trees may be especially valuable in the context of some aviation systems that may include large numbers of similar sub-systems or components.

In other examples, attack tree model(s) 18 of analysis computing system 2 may include parameterized templates (e.g., a parameterized attack tree model) and derived trees. A parameterized attack tree models is configured to be used with multiple systems, sub-systems, and/or components of aviation system 3. Parameterized attack tree models are configured such that the same tree fragment may be referenced in multiple locations. In some aviation systems, certain sub-trees are frequently repeated, with minor differences. These differences are captured as free parameters, which are then given concrete values wherever they are referenced.

For example, analysis computing system 2 may be configured to determine first parameters for a parameterized attack tree model for a first system, sub-system, or component of the aviation system (e.g., components in ACS system 7), and then perform a first assessment of the first system, sub-system, or component of the aviation system using the parameterized attack tree model and the first parameters. Analysis computing system 2 may be further configured to determine second parameters for the same parameterized attack tree model for a second system, sub-system, or component of the aviation system (e.g., components in AIS system 9), and perform a second assessment of the second system, sub-system, or component of the aviation system using the parameterized attack tree model and second first parameters.

In other examples, analysis computing system 2 may be configured to use completely separate attack tree models for different systems, sub-systems, and/or components of aviation system 3. For example, attack tree model(s) 18 may include a first attack tree model for a first system, sub-system, or component of aviation system 3 and may further include a second attack tree model for a second system, sub-system, or component of aviation system 3. Analysis computing system 2 may be configured to perform a first assessment of the first system, sub-system, or component of the aviation system using the first attack tree model, perform a second assessment of the second system, sub-system, or component of the aviation system using the second attack tree model, and aggregate outputs of the first assessment and the second assessment.

In one example, a parent tree node of attack tree model(s) 18 may correspond to an event of sensitive data being intercepted by an attacker. In this example, the sensitive data may be intercepted using a man-in-the-middle attack. Furthermore, in this example, a man-in-the-middle-attack may occur if either or both a first sub-system that sends the sensitive data or a second sub-system that receives the sensitive data is compromised. In this example, there may be a predefined sub-tree for a sub-system being compromised. Hence, in this example, attack tree model(s) 18 may include a tree node corresponding to the event of the sensitive data being intercepted. Additionally, application 5 may automatically add a first instance and a second instance of the predefined sub-tree to attack tree model(s) 18. The first instance corresponds to the first sub-system being compromised and the second instance corresponds to the second sub-system being compromised. Root tree nodes of the two instances of the predefined sub-tree are child tree nodes of the tree node corresponding to the event of the sensitive data being compromised.

To properly lower the barrier to entry for attack tree model creation, analysis computing system 2 may include tools for identifying and updating vulnerability concerns for aviation system 3. Analysis computing system 2 may include attack tree model importing tools for NIST SP 800-53 Controls, CWE Descriptions, and Extensible Configuration Checklist Definition Format (XCCDF) XML. Such tools define different security standards that apply directly to attack tree model architecture. In addition to addressing vulnerability concerns, analysis computing system 2 may further include tools address avionics-specific security concerns in tree models.

Analysis computing system 2 may include interfaces and inputs that allow a user to form common categorizations of system assets of aviation system 3. Communication units, for example, may all share a common set of security concerns from vendor-specific vulnerabilities. Developing generalized categories for system assets will promote reusable and generalized security options that can be identified by non-subject matter experts.

As part of this task, analysis computing system 2 may store system assets of aviation system 3 according to an asset type to identify the category of an individual asset (e.g., individual system, sub-system, or component). The asset type will be gathered by querying status information of the node or by manual configuration by a user. Applying a base type or category to system assets enables analogous security precautions to be taken against similar assets. For example, all communication units share a common set of security concerns. Categorization enables a guided approach to identifying and strengthening the security posture of assets.

Test agents 12 may comprise software modules configured to gather data from targets in aviation system 3. In other words, each of test agents 12 may perform one or more assessments on systems, sub-systems, and/or components of aviation system 3. Test agents 12 may perform such assessments through one or more of operational testing, code inspection, requirements testing, automated static analysis, or automated dynamic analysis on one or more of the systems, sub-systems, or components of aviation system 3. In some examples, test agents 12 may be modular and may be plugged-in and removed from a framework provided by application 5.

Test agents 12 may be configured to use of NIST Security Content Automation Protocol (SCAP) standards, such as the Open Vulnerability and Assessment Language (OVAL), Common Weakness Enumeration (CWE), and the Common Vulnerabilities and Exposures (CVE) database. In addition to SCAP-based testing, test agents 12 may also execute commands directly, allowing test agents 12 to integrate with static or dynamic code analysis software and other tools. Analysis computing system may analyze and summarize test results, both automated and manual, in a dashboard format that lets the user pinpoint critical risks and the most cost-effective means to address them.

This disclosure may refer to gathering data from an asset as "querying" the asset. In this disclosure, an "asset" may refer to a system, sub-system, or component of aviation system 3. This disclosure may refer to a group of systems, sub-systems, and/or components as an "asset group." A "asset node" for a test agent is a particular component from which the test agent gathers data. As described elsewhere in this disclosure, asset nodes are discrete components of aviation system 3. For example, an asset system node may comprise a physical device, such as one of system nodes 4 or a virtual machine hosted by one of system nodes 4. In some examples, software applications, such as device management software, run on one or more of system nodes 4. In this example, the device management software may run on one of system nodes 4 and may manage one or more other system nodes of distributed computing system 4. In an M&S system, system nodes may be discrete components of the M&S system that are suitable for running simulations or managing other components.

To support avionics-specific security concerns, test agents 12 may further include an asset integrity evaluator. The goal of this feature will be to verify that assets have not been tampered with. Analysis computing system 2, through test agents 12, may execute automated testing functionality to identify misconfigured or malfunctioning components of aviation system 3. In some examples, the automated test check if the stored hash matches the system hash, proving that the state of the machine has not been altered. This feature will allow users to quickly identify malfunctioning data on the target system in an attack tree leaf node. One goal of this task is to enable a low-skill approach to outlining risks to software components. By introducing some classification information about the asset nodes, analysis computing system 2 may provide suggestions and best practices for dealing with the class of asset.

Test agents 12 may be implemented in various ways. In some examples, a test agent of application 5 communicates with a corresponding software module running on processing unit (e.g., a processor) of a system, sub-system, or component of aviation system 3. The corresponding software module running on a processing unit of aviation system 3 may exist for the purpose of providing data to a test agent. In other examples, the corresponding software module may be more general purpose, such as a web server, command shell host, or other type of software module. In some examples, a corresponding software module on a system node may simply be part of software for performing a task of a processing unit of aviation system 3.

A test agent may receive data from a system, sub-system, or component of aviation system 3 in various ways. In other words, a test agent may perform a data gathering routine in various ways. In some examples, a test agent may request data from a system, sub-system, or component of aviation system 3. In some examples, a test agent receives push data from a system, sub-system, or component of aviation system 3. In some examples, a system, sub-system, or component of aviation system 3 publishes data to a data store from which a test agent reads the data. In some examples, a test agent may gather data from a system, sub-system, or component of aviation system 3 by invoking one or more methods of an application programming interface (API) implemented by a system, sub-system, or component of aviation system 3. To ensure integrity of collected data in transit, communication between a test agent and a system, sub-system, or component of aviation system 3 may occur through the Secure Sockets Layer (SSL) protocol.

To support the potentially large, federated structure of aviation systems, the notion of an asset group is introduced. An asset group is a set of system nodes (e.g., computing devices, VMs, communication devices, communication buses, etc.) in aviation system 3. The use of asset groups may be helpful when configuring large numbers of system nodes for automated testing is prohibitively tedious. Limitations on low-level components in an aviation system sometimes prevent direct automated testing.

In some examples, a test agent may need to determine one or more parameters when communicating with a system node. For instance, one or more system nodes aviation system 3 may require test agents 12 provide valid authentication credentials as a condition of sending particular types (e.g., data indicating measurements generated by the system node, data indicating a firmware version of the system node, etc.) of data to test agents 12. For example, a system node may request a test agent provide a valid username and password. In this example, the system node does not send particular types of data to the test agent unless the username and password provided by the test agent are valid. Other types of parameters may include network addresses, port numbers, and indications of communication protocols to use for communicating with asset system nodes, user access credentials, API endpoints, and so on. In some examples, import/export module 14 may import such parameters from one or more files. Furthermore, in some examples, GUI module 8 may output, for display, one or more user interfaces for editing such parameters.

In some examples, GUI module 8 may output a group definition interface for display. GUI module 8 may receive, via the group definition interface, indications of user input to define asset groups. In other words, the group definition interface may enable a user of application 5 to define asset groups. In some examples, GUI module 8 may generate group definition data 26 based on the indications of user input defining asset groups.

In some examples, GUI module 8 may output, for display on display device 6, an agent-asset interface. GUI module 8 may receive, via the agent-asset interface, indications of user input to associate test agents with assets (e.g., asset system nodes or asset groups) in aviation system 3. In other words, a user may use the agent-asset interface to associate test agents 12 with system nodes or asset groups. Based on the indications of user input, GUI module 8 may generate data associating a test agent with an asset (i.e., group definition data 26). Group definition data 26 may be in the form of XML data, relational database data, or data structured in another manner.

Attack tree module 10 may use group definition data 26 to instruct particular test agents 12 to gather data from particular assets. For example, group definition data 26 may indicate that a test agent A of application 5 is associated with an asset B in aviation system 3. Hence, in this example, attack tree module 10 may instruct test agent A to gather data from asset B.

In some examples, application 5 interoperates with established guidance such as NIST Special Publication 800-53 and the Federal Risk and Authorization Management Program (FedRAMP). Application 5 may perform automated evaluations and computations on attack tree models, testing on-line to see whether particular vulnerabilities are present or known-weak configurations or libraries are in use, then computing metrics and costs based on component metrics. For example, tree goals may be augmented with additional attributes such as severity, impact, or remediation cost. These attributes can be static, or can be computed in terms of sub-goals. For example, a possible attack on a secure facility involves breaking windows to gain physical access. In this example, remediation cost could be added as an attribute to the window breaking tree goal to represent the cost of installing metal bars over the windows. In a monitoring sense, it is possible to attribute costs to the failure of an event. Application 5 may be configured to import tree nodes from the National Vulnerability Database (i.e., the NIST National Vulnerability Database). These vulnerabilities have a standardized severity score between 1 and 10. Application 5 may highlight nodes based on the severity of the score.

Automated evaluations performed by test agents 12 may make use of NIST Security Content Automation Protocol (SCAP) standards, such as the Open Vulnerability and Assessment Language (OVAL), Common Weakness Enumeration (CWE), and the Common Vulnerabilities and Exposures (CVE) database. In addition to SCAP-based testing, test agents 12 may also execute commands directly on asset system nodes of aviation system 3 using Secure Shell (SSH) and may use management APIs for cloud infrastructures, such as OpenStack and Amazon Web Services. Test results and up-to-date CVE results are returned as test records 24, which may store status information in a tree structure that mirrors the tree of attack tree model(s) 18. As describe elsewhere in this disclosure, attack tree module 10 may analyze test records and summarize the test records in a dashboard format that lets a user pinpoint critical risks and the most cost-effective means to address the risks.

In some examples, GUI module 8 may output, for display on display device 6, an agent-model interface. GUI module 8 may receive, via the agent-model interface, indications of user input to associate test agents with tree nodes of attack tree model(s) 18. In other words, a user may use agent-model interface to associate test agents 12 with tree nodes of attack tree model(s) 18. Based on the indications of user input, GUI module 8 may generate data associating a test agent with a tree node of attack tree model(s) 18 (i.e., agent-model data 22).

As discussed elsewhere in this disclosure, application 5 may automatically generate sub-trees within attack tree model(s) 18. For instance, application 5 may re-use the same predefined sub-tree for events that may happen at the level of a system node. In some such examples, application 5 may automatically associate system nodes with tree nodes of attack tree model(s) 18.

After performing assessments using test agents 12, analysis computing system 2 may output metrics indicative of the assessments. The metrics may include any recorded test data concerning the assessments, including indications of whether certain tests passed or failed, indications of security vulnerabilities, risk levels associated with security vulnerabilities, and aggregations of such data across multiple attack tree models. In one example, import/export module 14 may generate test records 24 based on data generated by test agents 12. In some examples, import/export module 14 may store test records 24 in files in a file system, such as a local file system. For instance, in some examples, import/export module 14 may generate test records 24 in XML-based files. Storing test records 24 as files in a file system, may allow application 5 to integrate with version control platforms, such as CVS and SVN.

Furthermore, in some examples, application 5 may store test records 24 in one or more XML files. In some examples, test records 24 may also include data for gathering information (e.g., for performing tests). For instance, test records 24 may include credentials for connecting to asset system nodes. In some examples, assets can be authenticated by a Secure Shell (SSH) key, entering a SSH username and password at test time, or by storing plaintext username and password in the XML file. Furthermore, in some examples, plaintext storage of authentication credentials may be replaced with a Java keystore option. This may allow a user to benefit from a simple configuration of many system nodes without many of the security concerns.

In some examples, when a test agent queries a test asset for status information, import/export module 14 writes the results in an XML format consistent with a tree structure of attack tree model(s) 18. In this way, attack tree module 10 may use test results 24 to determine a status of an event associated with a tree node of attack tree model(s) 18 corresponding to the event. For example, a tree node of attack tree model(s) 18 may correspond to an asset system node of aviation system 3 overheating. In this example, test results associated with the tree node of attack tree model(s) 18 may indicate temperature readings of the asset system node. Hence, in this example, attack tree module 10 may determine, based on the data associated with the tree node of attack tree model(s) 18, whether a particular processor of a system in aviation system 3 is overheating.

Test records 24 may contain information that is considered sensitive, such as hostnames, usernames, and configuration details of assets. To mitigate risks of leaking of information, application 5 may provide tools for securely storing test records 24. For example, a user may have an option to save a test record using a standardized encryption scheme, and then read back that data using an integrated user interface (i.e., an interface not external to application 5).

As mentioned briefly above, GUI module 8 may output a dashboard interface for display. The dashboard interface may aggregate test results 24 in a human readable view. For example, the test results generated by certain test agents 12 may indicate whether particular tests have passed or failed. Failure of a test may correspond to an event corresponding to a tree node of attack tree model(s) 18 occurring or potentially occurring together with an indication of the severity risk should that event occur. In this example, the dashboard interface may indicate which tests have passed and which tests have failed. Additionally, the dashboard interface may include a tree view that displays attack tree model(s) 18. For instance, the tree view may map test results to tree nodes in the tree structure of attack tree model(s) 18.

In some examples, the dashboard interface includes a compliance diagram. The compliance diagram may indicate whether events corresponding to tree nodes of attack tree model(s) 18 can occur, have occurred, will occur, or are occurring. Attack tree module 10 may determine, based on test records 24, whether the events corresponding to tree nodes of attack tree model(s) 18 can occur, have occurred, will occur, or are occurring. In some examples, the compliance diagram may comprise a pie chart or other form of data representation to indicate results of tests run by test agents 12.

Furthermore, in accordance with a technique of this disclosure, the dashboard may include a navigable timeline of configuration changes. In this context, a "configuration change" may correspond to a change in a configuration of an asset tested by a test agent. For example, a configuration change may correspond to a change of temperature, change of installed software version, change of enabled/disabled status of particular software, change of available bandwidth, change of network connectivity status, device on/off status, energy availability status (e.g., remaining battery life), number of system nodes in a cluster, or other types of data.

The navigable timeline may enable a user to explore configuration compliance at a glance. For example, the navigable timeline may comprise a line graph that plots a configuration of an asset over time. For instance, the line graph may plot bandwidth utilization of the asset over time. In some examples, by analyzing the navigable timeline, a user of application 5 may be able to determine whether an event is likely to occur in the future. Furthermore, because a line graph may help the user identify points in time where patterns change, the user may be able to determine a time at which a cause of the event occurred. The user may use other test results to determine what events happened before that time.

While in the dashboard view, the user may be able to analyze hardware components more closely. In some examples, tree nodes in attack tree model(s) 18 describe possible attacks to aviation system 3. Furthermore, in some examples, a user may focus on attack goals which are relevant to a particular system node or asset group. This may be done by integrating test assets more closely with attack tree model(s) 18. For instance, there may be disclosed vulnerabilities in certain specific devices or an entire class of devices in certain systems or sub-systems of aviation system 3. It may be useful to isolate tree members that are affected by the vulnerability. Integrating test assets closely with attack tree model(s) 18 may enable the test results tree (test record) to have a notion of what the attacks are and how the system may be vulnerable.

In some examples, import/export module 14 exports risk models as human-readable reports. In various examples, import/export module 14 may export a risk model in various formats. For instance, import/export module 14 may export a risk model as a Portable Document Format (PDF) document, a Rich Text Format (RTF) document, a Hypertext Markup Language (HTML) document, or a document in another format. In accordance with one or more techniques of this disclosure, the human-readable reports may be provided at a level of granularity appropriate for an aviation system.

Furthermore, in some examples, import/export module 14 may export one or more of test records 24. In some examples, when exporting a test record, GUI module 8 may output a graphical tree view interface for display and receive, via the graphical tree view interface, an indication of user input to select tree nodes of attack tree model(s) 18 worthy of including or excluding. The exported data may include not only the test results, but may also include indications of success or failure and/or data indicating implications of success or failure of tests (e.g., attack A cannot occur, event B may occur, etc.).

To comply with security standards, it is often common practice to document changes to system configurations. In some examples, import/export module 14 supports comparisons between historical test records. A user may then be able to observe a configuration change in a preview and may document that change in a human-readable format for filing. The user may be able to configure how much detail the report includes, depending on the desired amount of context.

Figure 3:
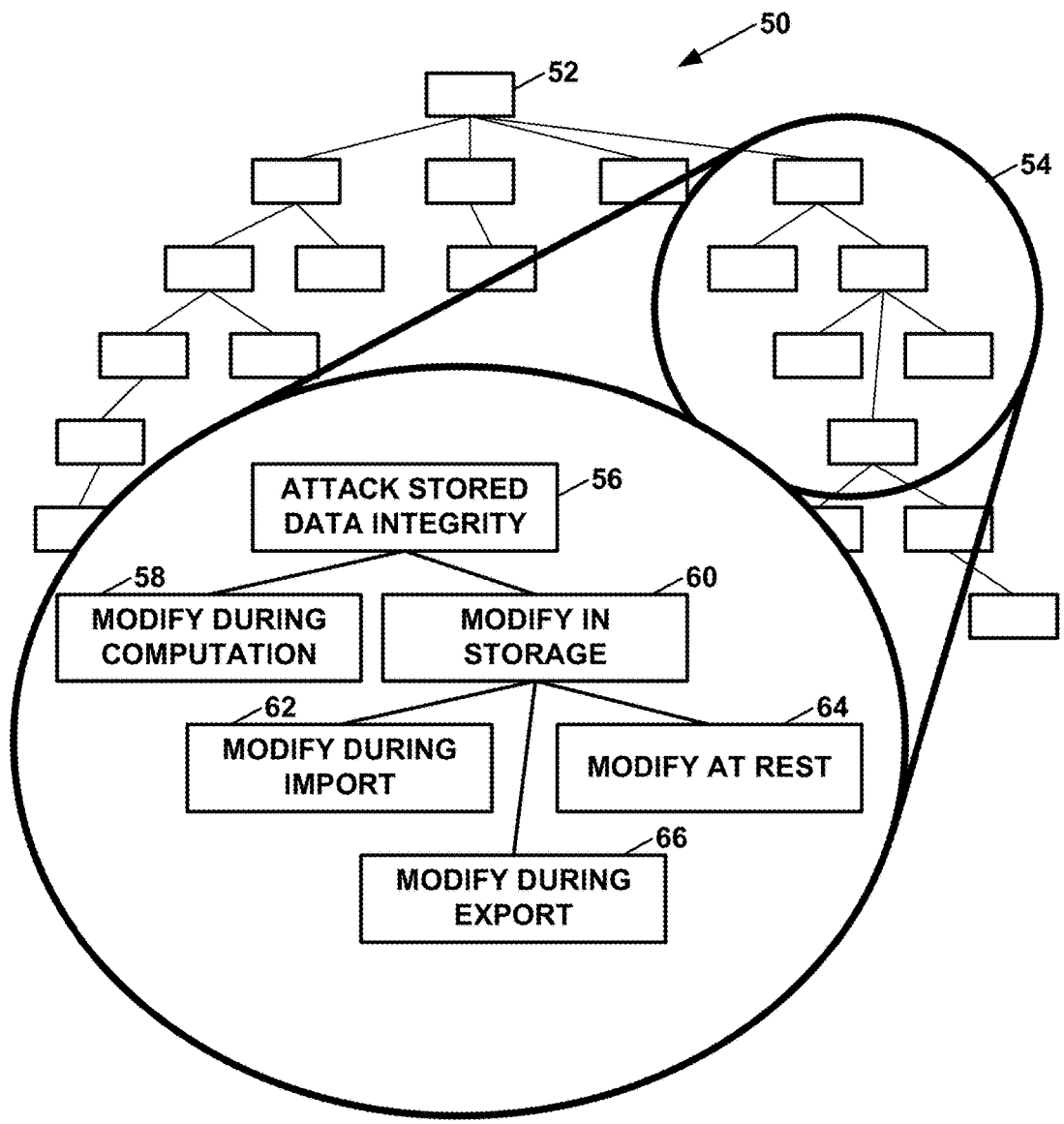
FIG. 3 is a block diagram illustrating an example attack tree model, in accordance with one or more aspects of this disclosure.

FIG. 3 is a block diagram illustrating an example attack tree model 50, in accordance with one or more aspects of this disclosure. In the example of FIG. 3, rectangular boxes correspond to tree nodes of a particular attack tree model of attack tree model(s) 18. A root tree node 52 has no parent tree nodes in attack tree model 50. In the example of FIG. 2, a portion 54 of attack tree model 50 is enlarged to show details of a subset of the tree nodes of attack tree model 50.

As shown in the example of FIG. 3, a tree node 56 corresponds to the event of an attack on stored data integrity. Child tree nodes 58 and 60 of tree node 56 correspond to disjunctive preconditions of a first event (i.e., an attack on stored data integrity). Particularly, tree node 58 corresponds to a second event (i.e., modifying data during computation) and tree node 60 corresponds to a third event (i.e., modifying data in storage). Furthermore, in the example of FIG. 3, child tree nodes 62, 64, and 66 of tree node 60 correspond to disjunctive preconditions of the third event (i.e., modifying data in storage). Particularly, tree node 62 corresponds to a fourth event (i.e., modifying data during import), tree node 64 corresponds to a fifth event (i.e., modifying data at rest), and tree node 66 corresponds to a sixth event (i.e., modifying data during export). In this way, FIG. 3 shows an excerpt of attack tree 50 that describes an attack on data integrity. Application 5 may store data associating each of tree nodes 56, 58, 60, 62, 64, and 66 with specific ways the events associated with tree nodes 56, 58, 60, 62, 64, and 66 may occur.

Figure 4:
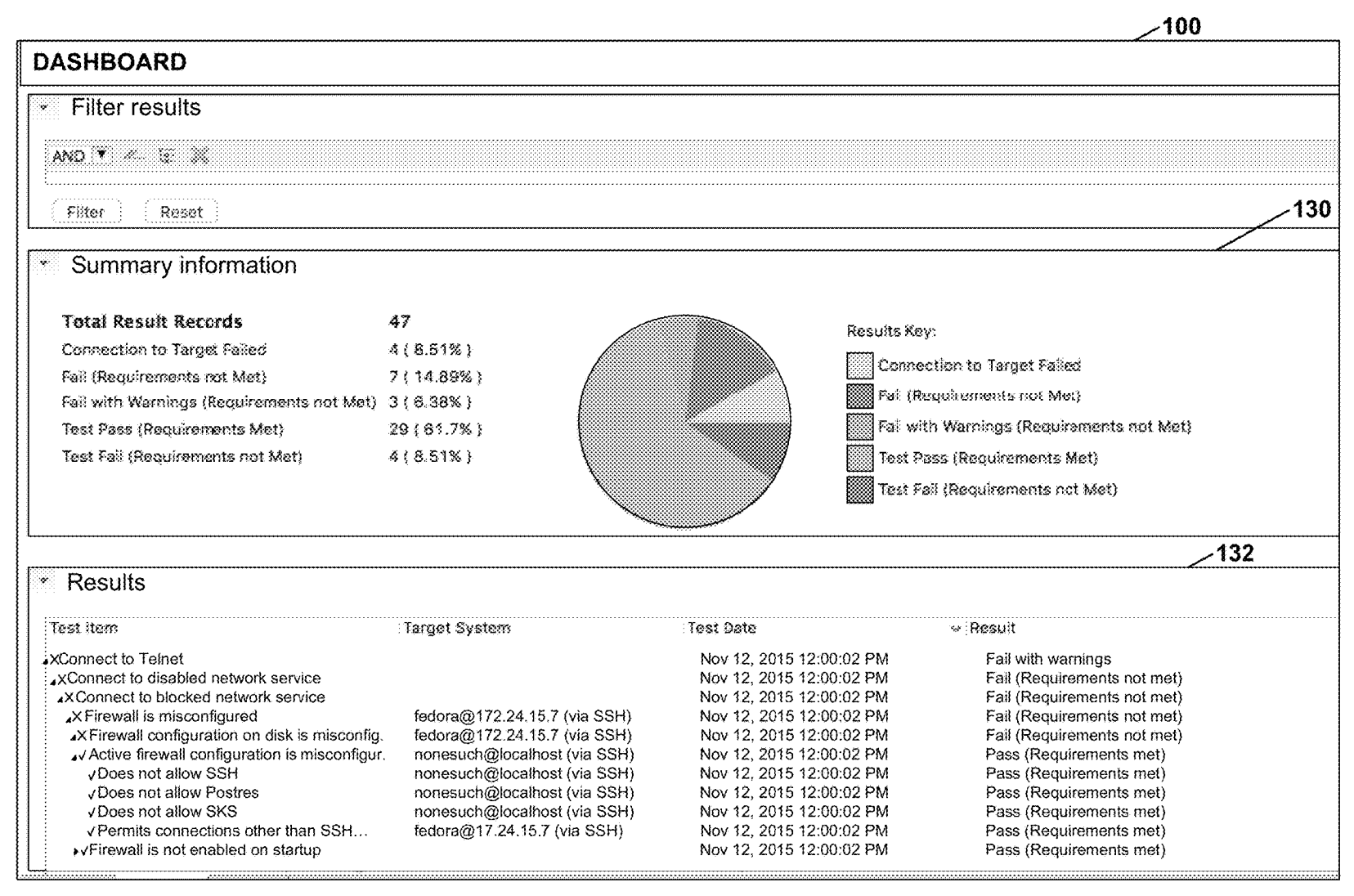

FIG. 4 is an example of a dashboard interface 100, in accordance with one or more aspects of this disclosure. Overall summary information may be included in area 130 of dashboard interface 100. The summary information may include the total result records of all tests that have been performed (e.g., by test agents 12), both in numerical and chart (e.g., pie-chart) form. These results may indicate, for example, the number of tests in which the connection to the asset (e.g., an asset node or node group in aviation system 3) failed, the number of tests that failed (such that requirements of the test were not met), the number of tests that failed with warnings (such that the requirements of the test were not met), the number of tests that passed (such that requirements of the test were met), and another category of tests that failed (such that requirements were not met). For various scenarios or instances in which there was a failure, attack tree module 10 may utilize an attack tree model to identify one or more operations or sub-operations in the risk mode (e.g., goals or sub-goals in an attack tree) that may be achieved in view of the failure, and to identify any corresponding vulnerabilities and associated scores in view of the failure, which may be output to the user as a group of graphical representations of such vulnerabilities.

Area 132 of the graphical user interface provides more specific tests results. Each of the test results includes a description of a test item, a name of the asset associated with the test (e.g., one of the systems, sub-systems, or components of aviation system 3), a test date, and test results. Each of the test items may be associated with one or more of the operations or sub-operations (e.g., goals or sub-goals) in the hierarchical attack tree model (e.g., attack tree model 50 of FIG. 3), and may also be associated with one or more potential vulnerabilities in the model when the corresponding test results indicate a failure. As shown in the "Result" column, test failures may cause the results to indicate that an adverse event is possible, alerting the user to possible issues with the target system(s). In some cases, a user may select one of the test items or results in area 132 to cause the GUI to display or highlight one or more tree nodes within the tree structure (e.g., shown in FIG. 3) that correspond to the test result (e.g., failure) and associated vulnerabilities, allowing the user to identify potential vulnerabilities in the model that are associated with the test results.

Although FIG. 4 presents test results in terms of passing and failing, in other examples, the data gathering routines need not be expressing in terms of passing and failing, but rather may be presented in terms of events occurring or not occurring.

Furthermore, in the example of FIG. 4, tree nodes in the attack tree model model shown in area 132 are expandable and collapsible to allow a user to view parts of the attack tree model of interest. For instance, in the example of FIG. 4, the user may be able to drill down in the test model to determine which event caused the event of "connect to Telnet" to occur. Additionally, "x" marks and checkmarks are used to indicate tests that have failed and tests that have passed, respectively.

Additionally, the "target system" column of area 132 identifies asset system nodes associated with the shown tree nodes of the test model.

Figure 5:
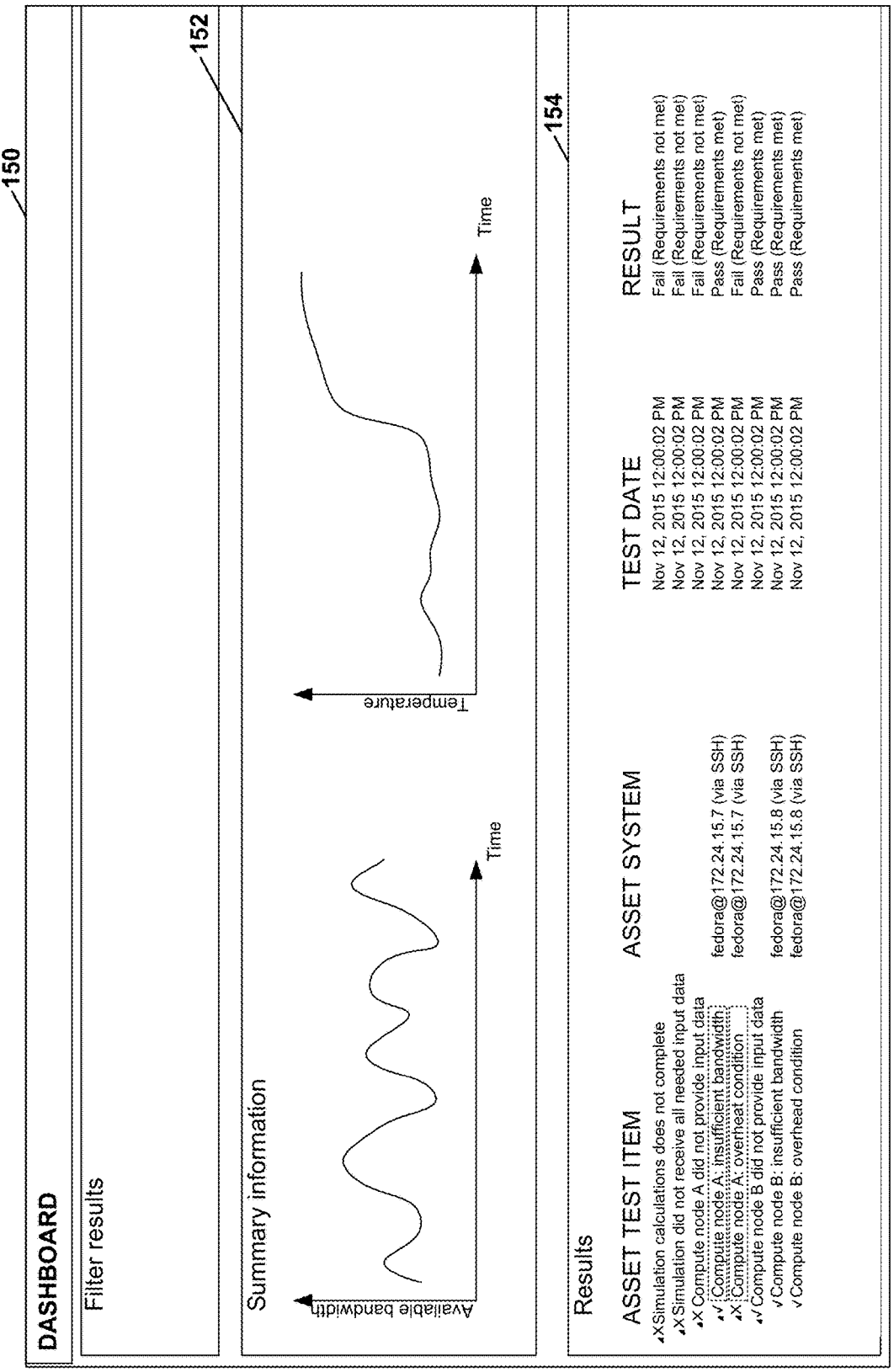
FIG. 5 is an example of a dashboard interface, in accordance with one or more aspects of this disclosure.

FIG. 5 is an example of a dashboard interface 150, in accordance with one or more aspects of this disclosure. Dashboard interface 150 is similar to dashboard interface 100 (FIG. 3). However, rather than showing a generalized summary of multiple tests, as shown in area 130 of dashboard interface 100, area 152 includes two-dimensional charts showing details of selected tree nodes of an attack tree model shown in area 154 of dashboard interface 150. Particularly, in the example of FIG. 5, the attack tree model shown in area 154 relates to an event of calculations not completing and potential reasons why the calculations do not complete. In this example, two of the possible reasons why the calculations do not complete is that either a compute node A or a compute node B of aviation system 3 did not provide input data. For each compute node of compute node A and compute node B, the compute node may fail to provide the input data because of insufficient bandwidth or an overheating condition occurring.

In response to receiving an indication of user input to select a tree node in area 154, GUI module 8 may output a representation of data gathered with respect to the selected tree node in area 152. In some instances, the representation of the gathered data may be a multi-dimensional (e.g., 2-D, 3-D) chart of the gathered data, a text representation of the gathered data, or another form of data representation. Thus, in the example of FIG. 5, analysis computing system 2 may output, for display, a multi-dimensional chart comprising a plurality of metrics, each respective metrics of the plurality of metrics based on (e.g., equal to, calculated using, etc.) a measurement gathered as part of a respective performance of the data gathering routine of a test agent. In some examples, algorithms for generating a representation of data gathered by a test agent may be programmed into the test agent, into attack tree module 10, or elsewhere. In some examples, the representation of the data may be user configured.

As shown in the example of FIG. 5, GUI module 8 has received indications of user input to select the tree nodes for compute node A having insufficient bandwidth and compute node A having the overheating condition. In response, GUI module 8 has output a 2-dimensional chart showing bandwidth availability of compute node. An over time and a 2-dimensional chart showing temperature of compute node A over time. Based on the charts, a user may be able to see the overheating condition of compute node A.

Figure 6:
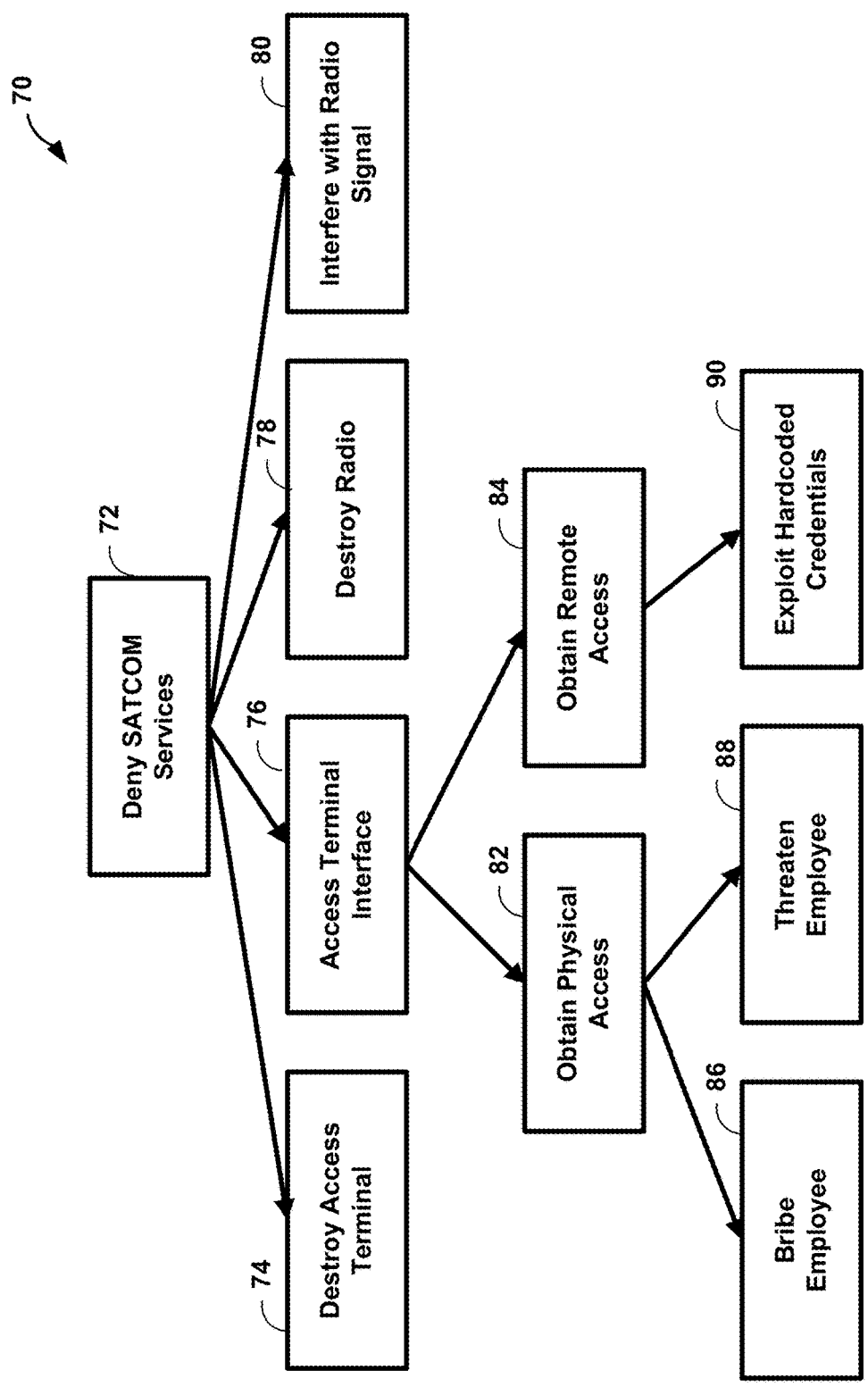
FIG. 6 is a block diagram illustrating an example aviation-specific attack tree model, in accordance with one or more aspects of this disclosure

FIG. 6 is a block diagram illustrating an example aviation-specific attack tree model, in accordance with one or more aspects of this disclosure. FIG. 6 shows an example attack tree model 70 that covers possible attacks against SATCOM services (e.g., SATCOM communications in ACS system 7). Attack tree model 70 may be directed to specific assets of aviation system 3. That is, analysis computing system 2, through test agents 12, may be configured to test one or more assets of aviation system 3 (e.g., system, sub-systems, and/or components) using one or more associated attack tree models.

System assets may include any avionics module that provides some utility to normal operation of aviation system 3. Assets can include hardware devices, software systems within those devices, or physical systems (e.g., operational staff). System assets can also have public or local interfaces which interact with other assets. Interfaces can be communication systems or dependencies within the asset network. Each asset not only has value to the operators and passengers, but also to the attacker. FIG. 6 shows an attack tree on a representative asset, in this case SATCOM link 17 of FIG. 1.

SATCOM link 17 is an example of a possible target asset. In some examples, target assets are most accessible to attackers when they provide some remotely accessible external interface. Analysis computing system 2, through execution of test agents 12, may assess the vulnerability of target assets using an attack tree model. If a test procedure passes, it indicates that the target asset is not susceptible to an attack.

A hypothetical example of this is in the context of communicating through SATCOM link 17. Attack tree model 70 includes a general deny SATCOM services node 72, which is a root node of attack tree model 70. Deny SATCOM services node may include one or more child nodes that define possible attack vectors that may result in the denial of SATCOM services (e.g., the inability to communication using SATCOM link 17). In the example of FIG. 6, the child nodes include destroy access terminal node 74, access terminal interface node 76, destroy radio node 78, and interfere radio signal 80. In this example, any one of the child nodes may result in the denial of SATCOM services.

The destroy access terminal node 74 may include tests to determine the susceptibility of an access terminal to SATCOM link to being physically destroyed. In this context, the access terminal may be any device used by a flight crew member to imitate and/or control communication through SATCOM link 17. The destroy radio node 78 may include tests to determine the susceptibility of the SATCOM radio itself being physically destroyed.

The access terminal interface node 76 may include tests to determine the susceptibility of an access terminal to SATCOM link to being physically accessed by unauthorized personnel. Such unauthorized access may result in SATCOM link being tampered with or inaccessible. As shown in FIG. 6, access terminal interface 76 may be split into additional child nodes, including obtain physical access node 82 and obtain remote access node 84. That is, attack tree model 70 may include multiple nodes that define how an attacker may obtain access to a terminal interface. In this case, remote access and physical access. Obtain physical access node 82 may be further divided into additional child nodes, including bribe employee node and threaten employee node 88. Such nodes may test the likelihood that physical access can be obtained to an access terminal through bribing an employee or threatening an employee. Likewise, obtain remove access node 84 may include an exploit hardcoded credentials node 90. The exploit hardcoded credentials node 90 may test the likelihood that an attacker may obtain an employee's credentials (e.g., username and password) that would allow the attacker to obtain remote access to an access terminal.

Attack tree model 70 may further include an interfere with radio signal node 80. An attack may be possible where an attacker attempts to disrupt communications through wireless interference. In a test environment, analysis computing system 2, through execution of a test agent 12 on attack tree model 70, could open a communication channel with the flight SATCOM link 7. Analysis computing system 2 could then simulate a wireless interference attack (e.g., jamming) and attempt to verify that onboard mitigation techniques are triggered. If the attack mitigation techniques maintain the open communication channel, attack tree module 10 would determine that the test procedure was successful and the attack is not possible.

Figure 7:
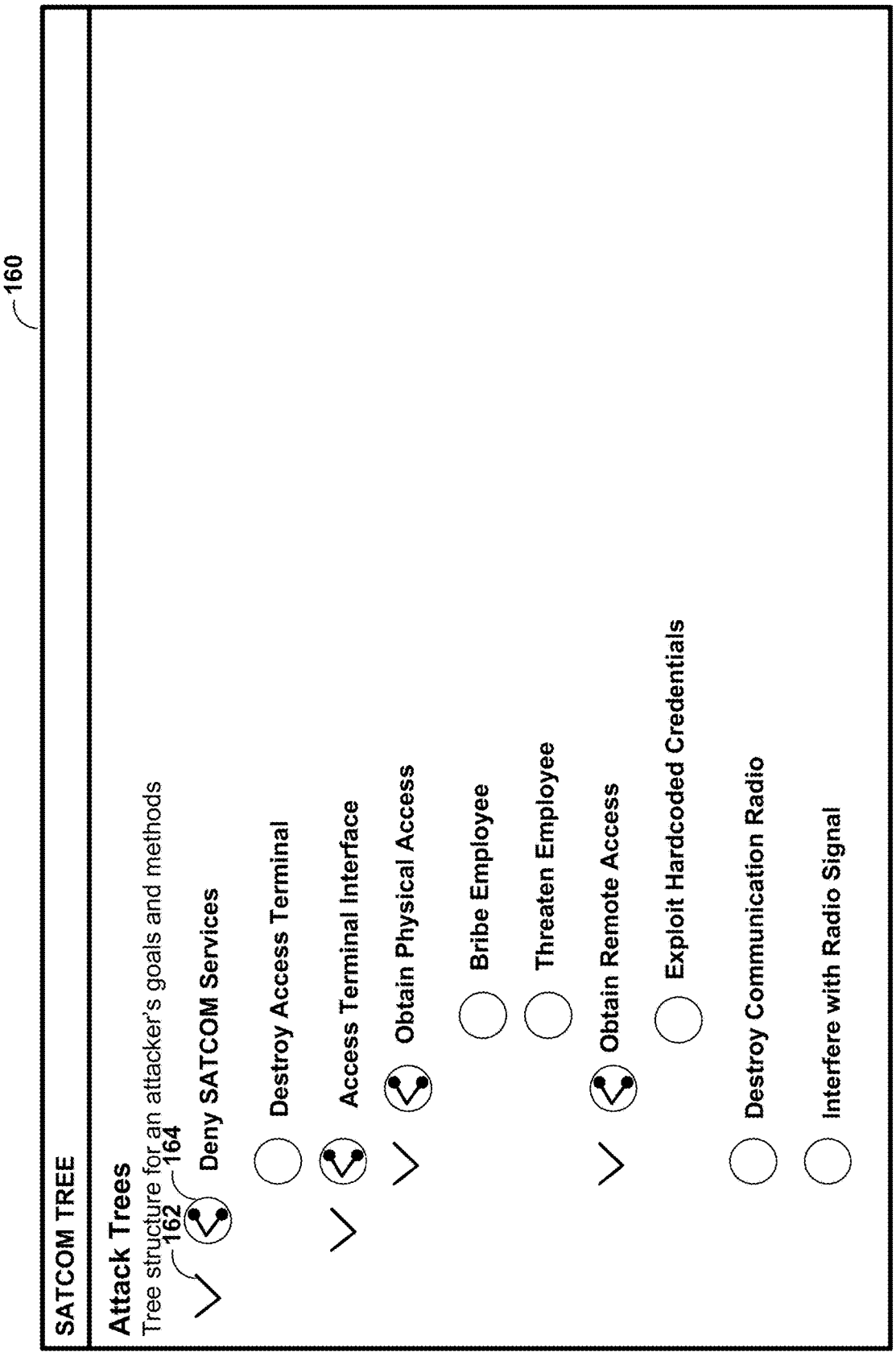
FIG. 7 is a conceptual diagram of a dashboard interface for the aviation-specific attack tree model of FIG. 6.

FIG. 7 is a conceptual diagram of a dashboard interface for the aviation-specific attack tree model of FIG. 6. Dashboard user interface 160 shows a visual representation of attack tree model 70 of FIG. 6. Each node of attack tree model 70 that includes one or more child nodes is indicated by arrow 162. In addition, dashboard user interface 160 may further include a branching symbol 164 next to a particular node to indicate that the node is split into one or more child nodes. Selection of a particular parent node will cause the child nodes of that parent node to be displayed. For example, selection of "Deny SATCOM Services" will cause the "Destroy Access Terminal," "Access Terminal Interface," "Destroy Communication Radio," and "Interfere with Radio Signal," nodes to be displayed.

Figure 8:
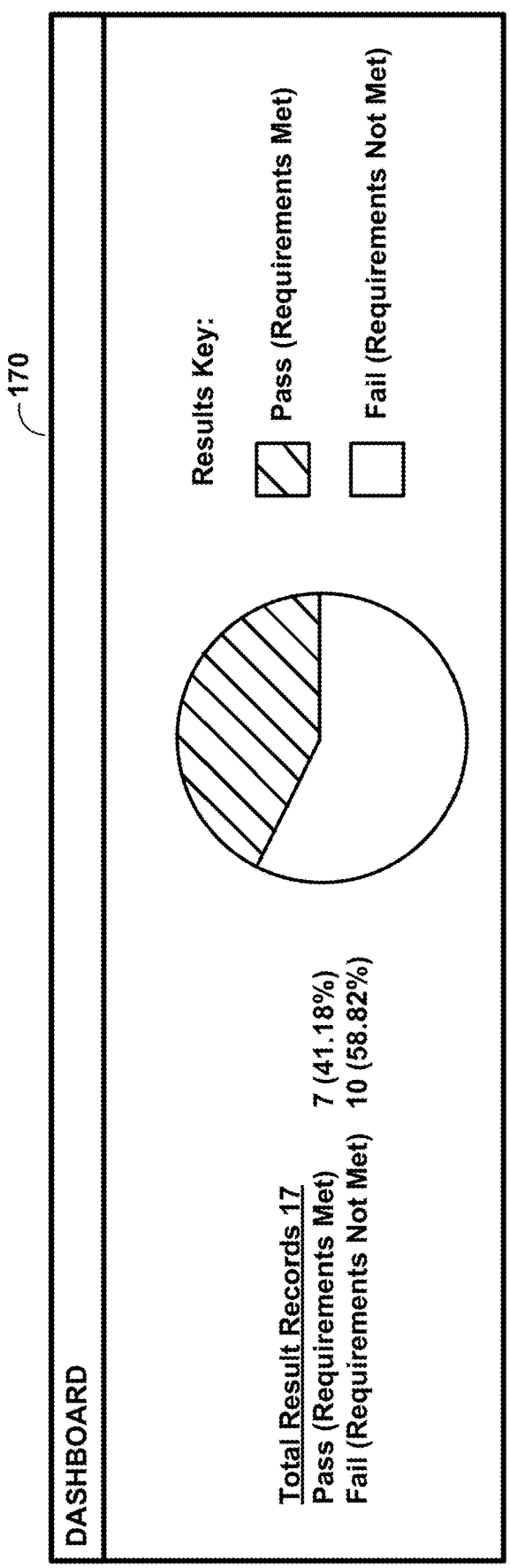
FIG. 8 is a conceptual diagram of an example results dashboard.

Dashboard user interface 160 allows a user to visualize the hierarchical structure of a particular attack node. Furthermore, as will be explained in more detail below, a user may select particular ones of the tree nodes to generate and view assessments results from the selected nodes. In this way, a user may better visualize outcomes of various assessments and different levels of the tree structure. FIG. 8 is a conceptual diagram of a results dashboard 170 that shows pass/fail results for a particularly selected attack tree model and/or grouping of tree nodes.

Analysis computing system 2, through execution of attack tree module 10, may be configured to model the security scope in attack tree structures, identify and assess system assets, and quantify risk to those assets. Risk metrics attempt to define objective values for loss or lapses in safety. Attack tree module 10 may incorporate quantitative measures of avionics risk to achieve this goal.

Figure 9:
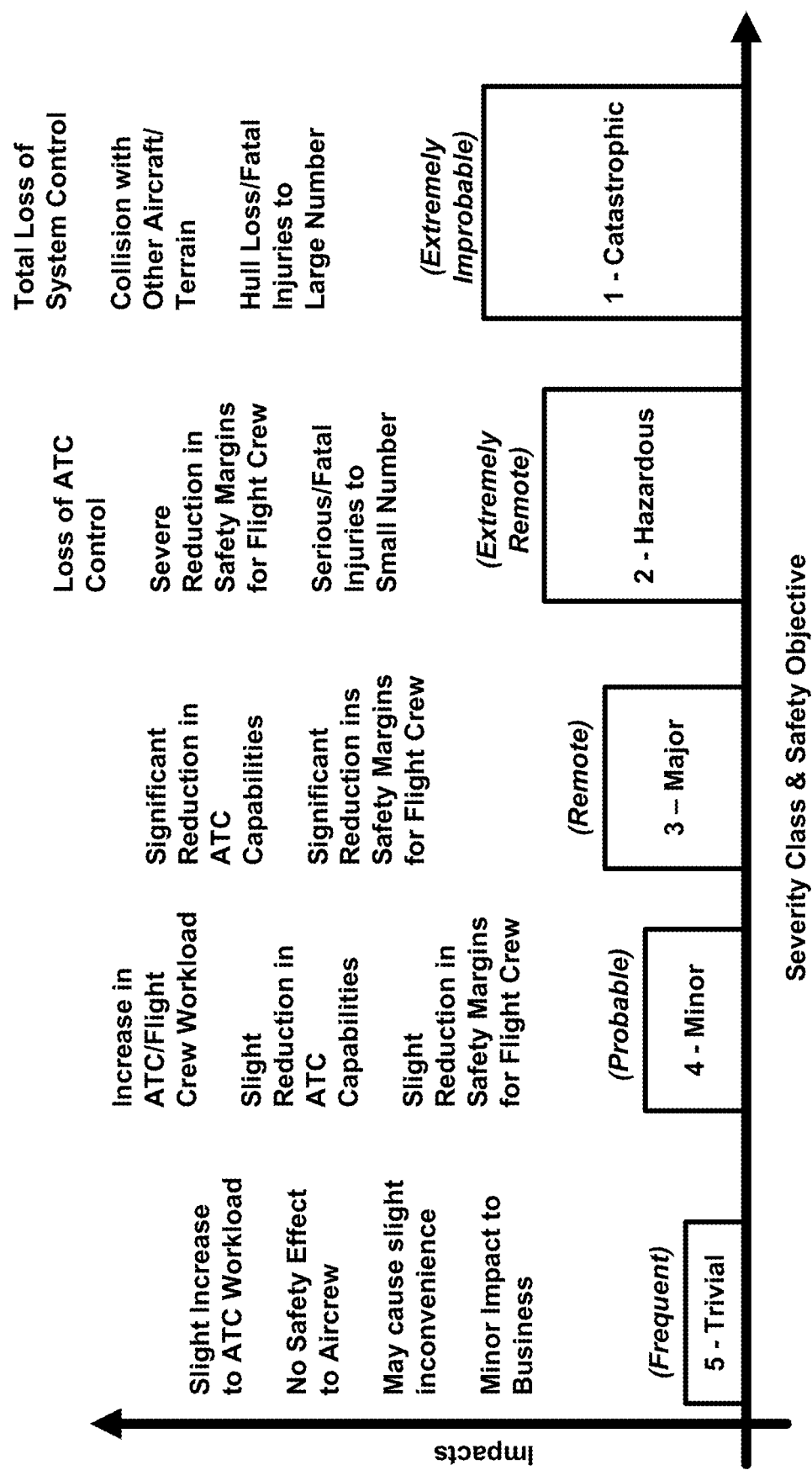
FIG. 9 is a conceptual diagram of example aviation-based severity classes and impacts.

FIG. 9 is a conceptual diagram of example aviation-based severity classes and impacts. As can be seen in FIG. 9, one example of classifying risk may be done based on the expected frequency of a certain type of attack/failure coupled with the severity of impact of the attack/failure. For example, a trivial (level 5) occurrent may happened fairly frequently, but be associated with attack/failures that are fairly low in impact. Such attacks and/or failures may result in impacts such as a light increase to air traffic control (ATC) workload, impacts that do not have a safety effect on aircrew, impacts that may cause slight inconvenience to aircrew, and/or impacts that have a minor impact to business.

A minor (level 4) occurrence may be probable to happen, and may be associated with attack/failures that are more impactful than level 5 impacts. Such attacks and/or failures may result in impacts such as an increase ATC and/or flight crew workload, impacts that result in a slight reduction in ATC capabilities, and/or impacts that effect a slight reduction in safety margins for the flight crew.

A major (level 3) occurrence may be remotely probable to happen, and may be associated with attack/failures that are more impactful than level 4 impacts. Such attacks and/or failures may result in impacts such as significant reductions in ATC capabilities, and/or a significant reduction in safety margins for the flight crew.

A hazardous (level 2) occurrence may be extremely remotely probable to happen, and may be associated with attack/failures that are even more impactful than level 3 impacts. Such attacks and/or failures may result in impacts such loss of ATC control, severe reduction in safety margins for the flight crew, and/or serious/fatal injuries to a small number of persons.

A catastrophic (level 1) occurrence may be extremely improbable to happen, and may be associated with attack/failures that are even more impactful than level 2 impacts. Such attacks and/or failures may result in impacts such total loss of system control, collision with other aircraft/terrain, hull loss, and fatal injuries to a large number.

As can be understood, aviation system 3 may include a very large number of different heterogenous systems, each associated with different types of risks, likelihood of risks, severity of risks, and impacts from such risks. In order to be able to perform an assessment as a whole, analysis computing system may use a quantitative risk model, such as shown in FIG. 9, to quantify risks in a way such that an entire aviation system can be assessed and analyzed in a meaningful way. For example, a large security flaw in a sub-system of PES 11 may actually prevent very low risk in terms of safety to the aircraft. However, a small security risk in a sub-system of ACS system 7 may play a larger role. By assigning quantitative metrics to the attack tree models for different systems of aviation system 3, systems with different risk dynamics can be analyzed together to form a complete picture for an entire system.

That is, analysis computing system 2 may aggregate assessments and resulting metrics from across multiple systems and display the combined results to a user. Additionally, a user may select individual attack tree models and system nodes (or groups of attack tree models and system nodes) and perform assessments and analysis of any combination of systems, sub-systems, and/or component of aviation system 3.

Analysis computing system 2 may include user interfaces that allow users to define asset classes, attach possible attack goals (e.g., specific attack tree models or specific tree nodes of attack tree models) to those assets, and evaluate risk in a streamlined way. Risks may also be evaluated using optional test procedures. The combination of test procedures with risk metrics enables users of analysis computing system 2 quickly, and often without any additional user interaction, highlight high-risk scenarios and their possible impacts. Ultimately, this will lead to improved safety and security within target systems of aviation system 3.

Representations of risk and accompanying metrics are not the only piece of data maintained that may be maintained by an attack tree model. Each node has the potential to carry arbitrary attributes. Analysis computing system 2 can store attributes and functions with each goal and sub-goal, enabling automatic computing and aggregating of metrics such as "responsible party", "severity", "impact", or "remediation cost" for a whole tree based on values on individual nodes. Attributes can be static, fixed values or can be computed in terms of values on sub-goals.

Analysis computing system 2 may be further configured to document these risk factors in human-readable reports. The reports will document a snapshot of system risks which can be used to maintain a record of compliance. The report may be useful in prioritizing high-risk components of the target system continuously throughout the development and testing process. The reports may also serve to guide the remediation of identified security concerns.

Figure 10:
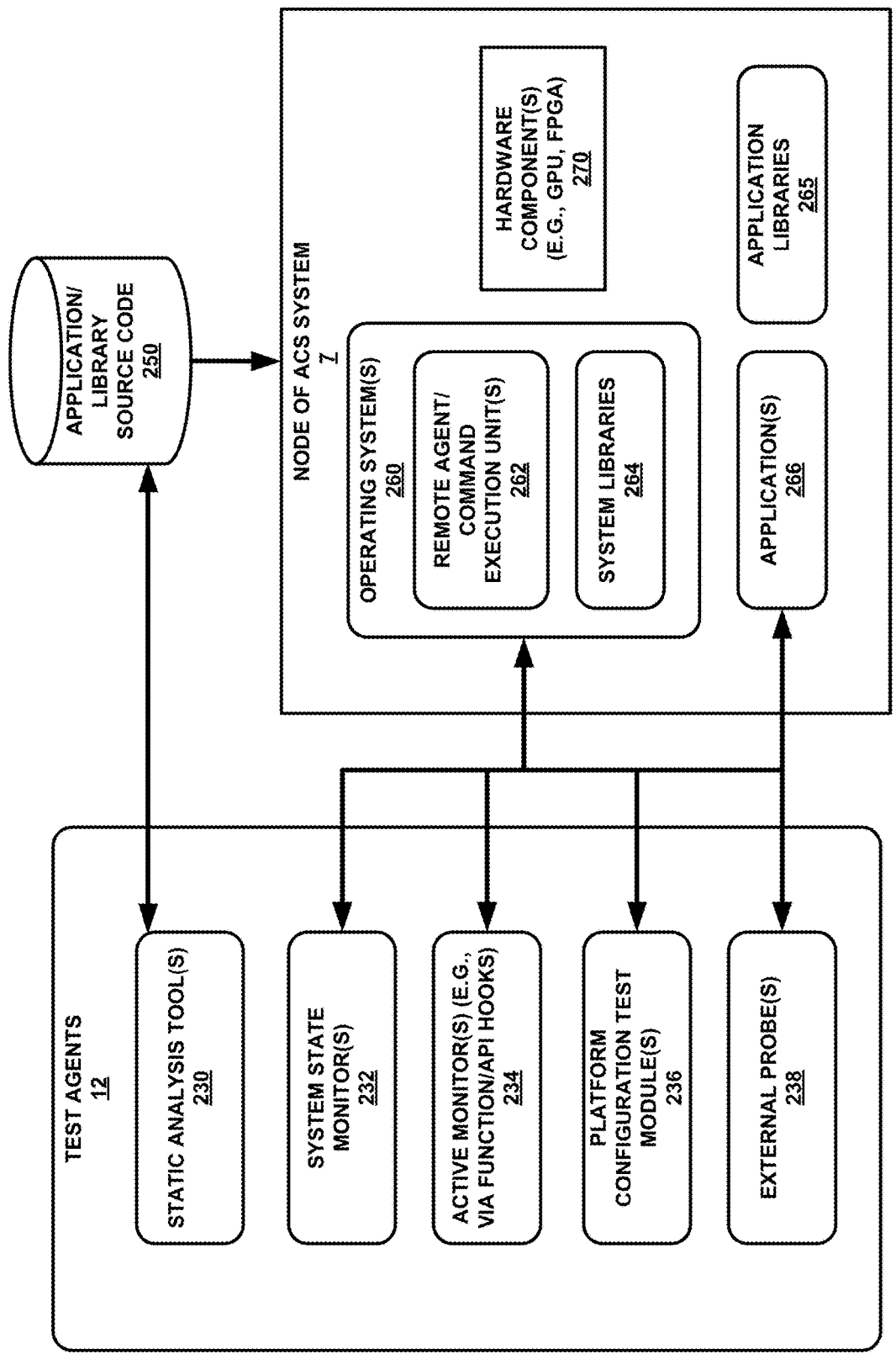
FIG. 10 is a block diagram illustrating one example of various components shown in FIG. 2, in accordance with one or more aspects of the present disclosure.

FIG. 10 is a block diagram illustrating one example of various components shown in FIG. 2, in accordance with one or more aspects of the present disclosure. FIG. 10, for example, illustrates further example details of test agents 12 and a node of ACS system 7 shown in FIG. 2.

As illustrated in FIG. 10, node of ACS system 7 may include one or more operating systems 260, one or more applications 266, one or more application libraries 265, and one or more hardware components 270 (e.g., one or more GPUs, one or more FPGAs). Operating systems 260 includes one or more remote agent/command execution units 262 and one or more system libraries 264. Although shown as separate blocks in FIG. 10, applications 266 may, in some cases, be included in operating systems 260.

Test agents 12, as illustrated in FIG. 10, may include one or more static analysis tools 230, one or more system state monitors 232, one or more active monitors (e.g., function and/or API hooks), one or more platform configuration test modules 236, and one or more external probes 238. Test agents 12 are part of analysis computing system 2. Analysis computing system 2 may monitor execution of applications 266 on a node of ACS system 7.

Static analysis tools 230 are capable of performing static analyses of any source code that is compiled or otherwise processed for execution of operating systems 260, including remote agent/command execution units 262 and libraries, and/or execution of applications 266 of a node of ACS system 7. In some cases, source code may be unavailable, in which case static analysis tools 230 may not be used or implemented. However, in other cases, such as illustrated in the example of FIG. 10, application and/or library source code 50 may be available for analysis by static analysis tools 230. In certain examples, as noted further below, application/library source code 250 may include Open Computing Language (OpenCL) code. In the example of FIG. 10, static analysis tools 230 may analyze application/library source code 250 that is compiled or otherwise processed for execution of system libraries 264, application libraries 265, and/or applications 266. Static analysis tools 230 may analyze code 250 based on one or more rules to identify, for instance, potentially malicious, unusual, or unexpected function calls or sequences of instructions that may cause risks or other vulnerabilities to system nodes 4 during use of system libraries 264, application libraries 265, and/or execution of applications 266. Static analysis tools 230 may provide analysis results to attack tree module 10 (FIG. 2) for further processing, as described further below.

System state monitors 232 may perform monitoring of operating systems 260 and/or applications 266. In some cases, system state monitors may perform one or more system state tests to obtain test result or monitoring information from operating systems 260 and/or applications 266. As one example, system state monitors 232 may monitor any changes to file systems used by operating systems 260 and/or applications 266, and may also, in some cases, determine which programs or processes are executing at a given time. In some instances, system state monitors 232 may invoke or otherwise utilize remote agent/command execution units 262 in a node of ACS system 7. Remote agent/command execution units 262 are operable to perform certain actions on system node 4A and provide corresponding results or other information (e.g., changes to file systems, information about which programs are executing) back to system state monitors 232 of analysis computing system 2. System state monitors 232 may provide monitoring information to attack tree module 10 (FIG. 2) for further processing.

Active monitors 234 may perform active monitoring of a node of ACS system 7 during execution of applications 266. In some examples, active monitors 234 may make use of function and/or API hooks that are implemented in a node of ACS system 7. In these examples, as further illustrated in FIG. 10, a node of ACS system 7 may provide wrappers or instrumented code for function and/or API calls that are invoked by applications 266 during execution. When applications 266 invoke these function and/or API calls, the wrappers or instrumented code intercept such calls and are capable of performing other analysis or monitoring functions, such as reporting the entire call stack and/or arguments for selected functions within a binary, system libraries 264, application libraries 265, or operating system 260.

Figure 11:
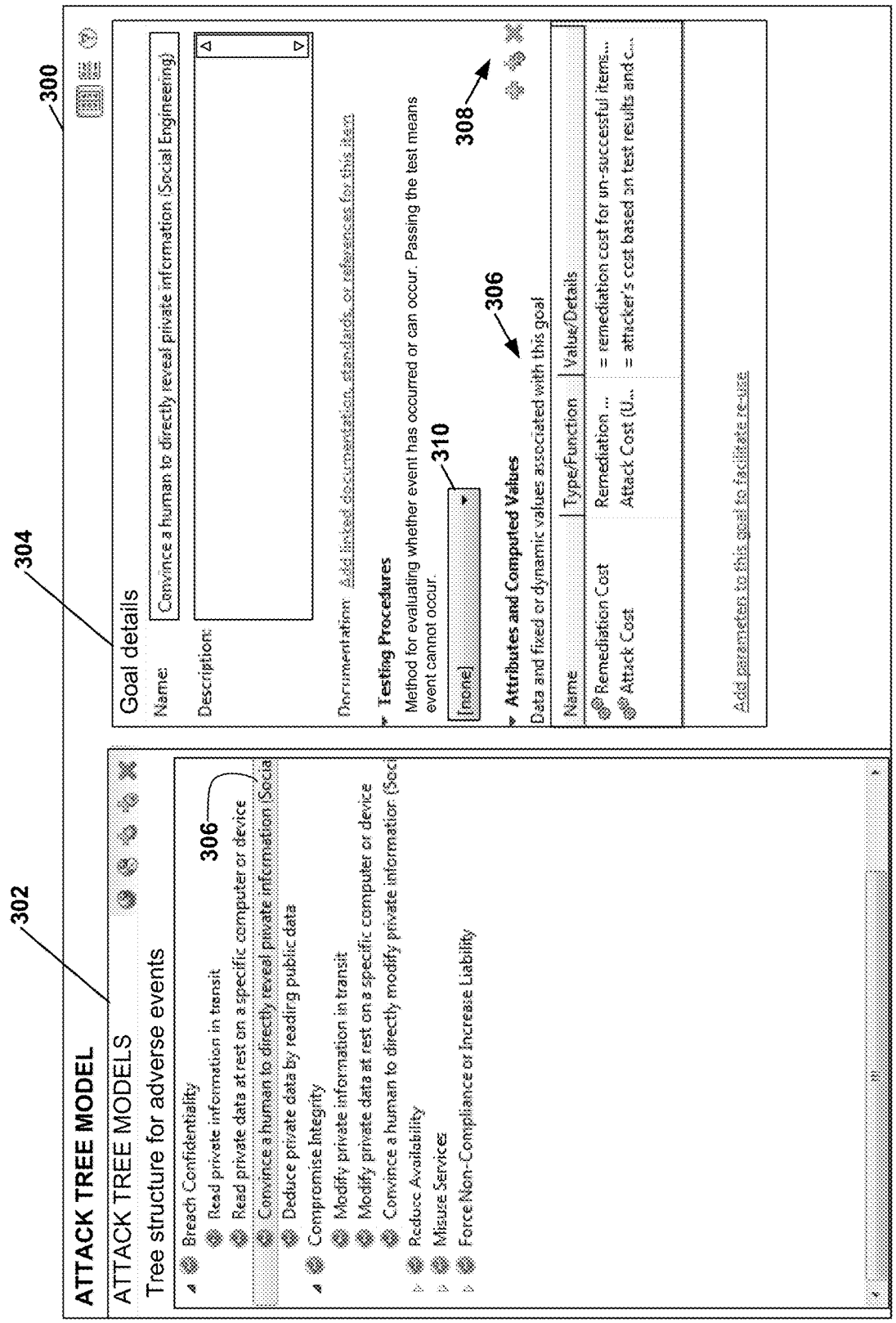
FIG. 11 is a screen diagram illustrating an example user interface for associating tree nodes of an attack tree model with test agents, in accordance with one or more aspects of the present disclosure.

FIG. 11 is a screen diagram illustrating an example user interface 300 for associating tree nodes of an attack tree model with test agents, in accordance with one or more aspects of the present disclosure. In the example of FIG. 11, an illustrated risk model 302 represents a tree structure for an attacker's goals and methods with respect to one or more attacks against an asset, such as a node of ACS system 7, AIS system 9, or PES 11. Furthermore, in the example of FIG. 11, attack tree model 302 includes five distinct root tree nodes that each represents a respective event (which, in the example of FIG. 11, are attack goals).

The five root tree nodes in risk model 302 of FIG. 11 represent the following five top-level events: breach confidentiality of aviation system 3 (FIG. 1), compromise integrity of aviation system 3, reduce availability of one or more systems, sub-systems, and/or components of system 3, misuse services of aviation system 3, and force compliance or increase liability with respect to aviation system 3. In addition, FIG. 11 illustrates example sub-events of certain ones of these root-level events. For example, the tree node of attack tree model 302 representing the event of breaching confidentiality has four sub-tree nodes that represent the following respective sub-events: read private information in transit, read private data at rest or a specific computer or device, convince a human to directly reveal private information, and deduce private data by reading public data. In addition, the tree node of risk model 302 representing the event of compromising integrity has three sub-tree nodes that represent the following respective sub-events: modify private information in transit, modify private data at rest on a specific computer or device, and convince a human to directly modify private information. As shown, the higher-level events may share one or more common sub-events, which may, in some examples, be represented by common sub-tree nodes in attack tree model 302.

Sub-events may be disjunctive (e.g., one of the sub-events must be met) or conjunctive (e.g., all sub-events must be met) in order for the parent event (e.g., root-level event) to be satisfied. In some examples, each respective leaf-level sub-event may be met because of a respective vulnerability in aviation system 3. For example, an attacker might insert a known-weak encryption algorithm, allowing an adversary to easily decode encrypted data in transit. Therefore, in the example of FIG. 11, attack tree model 302 may represent how vulnerabilities (e.g., vulnerabilities based on execution of malware) can be exploited to achieve an attacker's possible aims on aviation system 3, or specific asset system nodes or asset groups in aviation system 3.

In accordance with a technique of this disclosure, a GUI containing a representation of a risk model may be expanded or collapsed at each non-leaf tree node. Thus, a user may be able to focus on parts of the risk model currently of interest. For instance, in the example of FIG. 11, the tree nodes corresponding to "Breach Confidentiality" and "Compromise Integrity" are expanded while tree nodes corresponding to "Reduce Availability," "Misuse Services," and "Force Non-Compliance or Increase Liability."

As further shown in the non-limiting example of FIG. 11, in addition to displaying the details of attack tree model 302, user interface 300 may also display additional details, as shown on the right-hand side of the graphical user interface, in area 304 of FIG. 11. For example, various additional goal details may be provided for any of the tree nodes in attack tree model 302. In FIG. 11, application 5 has received an indication of user input to select a sub-tree node 306 representing a sub-event of convincing a human to directly reveal private information, which occurs under the parent tree node representing the goal to breach confidentiality. The selected sub-tree node (i.e., sub-tree node 306) is highlighted in attack tree model 302 of FIG. 11. On the right-hand side of FIG. 11, the name of the selected sub-event is shown, and any available and additional description or documentation may be provided with respect to the selected event, although none are shown in the example of FIG. 11.

Thus, in the example of FIG. 11, analysis computing system 2 may receive an indication of user input to associate a test agent with a tree node in attack tree model(s) 18. Furthermore, in response to receiving the indication of user input to associate the test agent with the tree node, analysis computing system 2 may generate data (e.g., agent-model data 22) associating the test agent with the tree node.

User interface 300 may also include further details regarding testing procedures that may be performed in the portion of area 304 labeled "Testing Procedures," although none are shown in the example of FIG. 11. These testing procedures may include procedures for determining or evaluating whether an event or sub-event associated with the selected tree node of attack tree model 302 has occurred or can occur. The passing of tests that are included in the testing procedure may indicate that the event or sub-event associated with the selected tree node of attack tree model 302 cannot take place.

In the example of FIG. 11, area 304 includes a dropdown box 310. In response to receiving an indication of user selection of dropdown box 310, GUI module 8 may display a list of available testing procedures to associate with the selected tree node of attack tree model 302. Testing procedures in the list of available testing procedures may correspond to respective test agents (e.g., test agents 12 of FIG. 2). In response to receiving an indication of user input to select one of the available testing procedures listed in dropdown box 310, GUI module 8 may generate data (e.g., agent-model data 22 of FIG. 2) associating the selected available testing procedure with the selected tree node of attack tree model 302. In this way, user interface 300 may enable a user of application 5 to associate test agents with tree nodes of attack tree model 302.

In the example of FIG. 11, user interface 300 also includes further details regarding attributes and computed values in a portion 308 of area 304 labeled "Attributes and Computed Values." The attributes and computed values may include software data, such as fixed or dynamic values, associated with the respective event or sub-event. Software modules may be used to compute particular values, such as attack costs. In the example of FIG. 11, the software modules are shown that relate to remediation costs and attack costs. The attack cost may be associated with the attacker's cost based on test results, and the remediation cost may be associated with any remediation costs for fixing one or more items based on unsuccessful attempts to prevent an attack. A user may use controls 308 to add, configure, or remove software modules for determining attributes, costs, and other data based on data gathered by test agents.

Attack tree module 10 is configured to perform automated evaluations and computations on risk models, testing on-line to see whether particular events can occur (e.g., based on whether known weak configurations or libraries are in use, such as in system libraries 264 (FIG. 10) and/or application libraries 265 (FIG. 10)). Attack tree module 10 may compute metrics and/or costs based on component metrics. Attack tree module 10 may analyze monitoring information provided by test agents 12, which may include test results, and may also, in some cases, use information provided by local knowledge base 16 and/or central knowledge base 28. For example, central knowledge base 28 may include information about known or common vulnerabilities and exposures. Attack tree module 10 may summarize the results of the analyses, for example, in a dashboard that is output for display by GUI module 8, which may enable a user to identify and even potentially pinpoint risks and potentially cost-effective means to address the identified risks. In various examples, the structure of an attacker's methodologies is implicit in the attack tree model used by attack tree module 10, allowing severity or complexity information reported by individual ones of test agents 12, or for individual components, to appropriately bubble-up to root-level software assurance goals.

In an attack tree output via GUI module 8, attack tree module 10 may compute aggregate risks or other statistics for one or more of the potential vulnerabilities. In some examples, the attack tree model may identify potentially cost-effective places within the risk model to address such potential vulnerabilities. For instance, if an analyst assigned costs to fix or re-implement various components (e.g., components of a node of aviation system 3, such as applications 266 (FIG. 10)), the attack tree model may help identify or potentially pinpoint the most cost-effective places to address such vulnerabilities (e.g., in applications 266, system libraries 264 (FIG. 10), application libraries 265 (FIG. 10)) given the test results.

Figure 12:
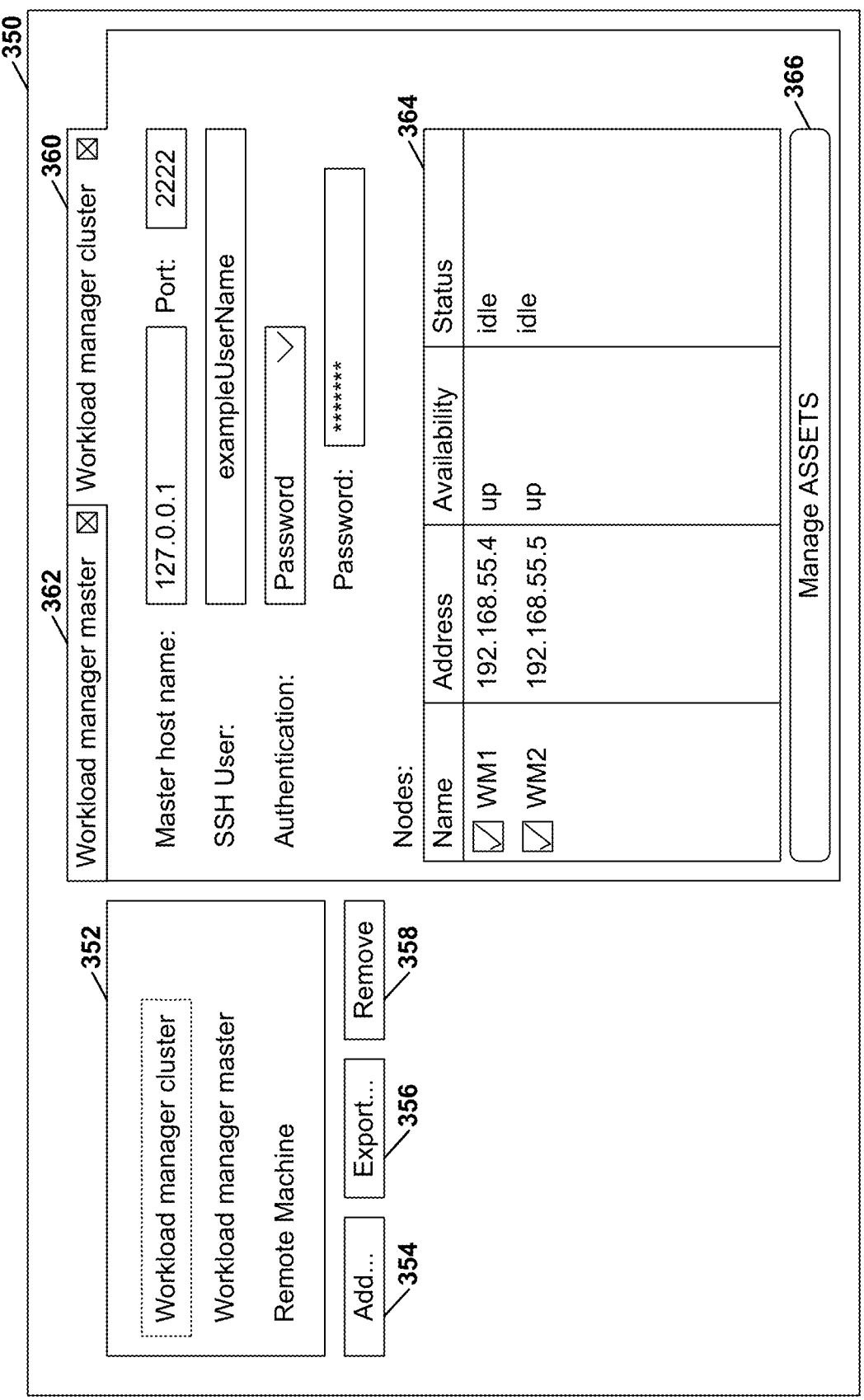
FIG. 12 is an example screen diagram illustrating an example target configuration interface for defining target groups, in accordance with one or more aspects of this disclosure.

FIG. 12 is an example screen diagram illustrating an example target configuration interface 350 for defining target groups, in accordance with one or more aspects of this disclosure. In response to receiving indications of user input directed to target configuration interface 350, application 5 (FIG. 2) may generate information defining a target group or asset group (e.g., group definition data 26). As discussed elsewhere in this disclosure, a target group or asset group may include one target system node or a plurality of target system nodes of aviation system 3 (FIG. 1).

In the example of FIG. 12, target configuration interface 350 comprises a group selection area 352 that includes a list of already-defined target groups. In the example of FIG. 7, group selection area 352 lists three target groups: "Workload manager cluster," "Workload manager master," and "Remote Machine." Additionally, target configuration interface 350 includes buttons 354, 356, and 358 to add, export, and remove target groups, respectively. In response to receiving an indication of user input selecting button 354, GUI module 8 may output for display a dialog box prompting a user to input a name of a new target group, after which GUI module 8 may display the name of the new target group in group selection area 352. In response to receiving an indication of user input selecting button 358, GUI module 8 may remove whichever target group is selected in group selection area 352. In response to receiving an indication of user input selecting button 356, import/export module 14 may export data regarding one or more of the target groups listed in group selection area 352. For instance, in some examples, in response to receiving an indication of user input selecting button 356, import/export module 14 may export data regarding whichever target group is selected in group selection area 352. In some examples, in response to receiving an indication of user input selecting button 356, import/export module 14 may export data regarding each target group listed in group selection area 352.

As noted above, GUI module 8 may receive an indication of user input to select a target group in group selection area 352. In response to receiving an indication of user input to select a target group in group selection area 352, GUI module 8 may output, within target configuration interface 350, a tab corresponding to the selected target group. In the example of FIG. 12, GUI module 8 has received an indication of user input to select the target group titled "Workload manager cluster." Accordingly, GUI module 8 has output, within target configuration interface 350, a tab 360 corresponding to the target group titled "Workload manager cluster." For ease of use, target configuration interface 350 may also include tabs, such as tab 362, corresponding to other target groups (e.g., other previously selected target groups).

In the example of FIG. 12, a tab corresponding to a selected target group includes a node list area that lists system node in the selected target group. For instance, tab 360 includes a node list area 364 that lists system nodes in the "Workload manager cluster" target group. Furthermore, the tab corresponding to the selected target group may include a manage targets button, such as button 366. In response to receiving an indication of user input to select the manage targets button, GUI module 8 may output, for display, UI features (e.g., a dialog box) for receiving indications of user input indicating a system node of aviation system 3 to add to the selected target group. In some examples, as part of receiving the indication of user input to add a system node to the selected target group, GUI module 8 may receive an indication of user input specifying an Internet Protocol (IP) address of the system node. Furthermore, in some examples, GUI module 8 may receive an indication of user input from the displayed UI features to remove a system node from the selected target group.

Thus, in the example of FIG. 12, analysis computing system 2 may output, for display on display device 6, target configuration interface 350. Additionally, analysis computing system 2 may receive, via target configuration interface 350, indications of user input to define a target such that the target comprises the one or more system nodes in aviation system 3. In response to receiving the indications of the user input to define the target such that the target comprises the one or more system nodes (e.g., one system node, a plurality of system node, etc.) in aviation system 3, analysis computing system 2 may define the target such that the target comprises the one or more system nodes in aviation system 3. As shown in the example of FIG. 12, analysis computing system 2 may receive indications of user input to define the target such that the target comprises a plurality of system nodes in aviation system 3 and an indication of user input to define a name of the target (e.g., "Workload manager cluster," "Workload manager master," etc.). Furthermore, as shown in the example of FIG. 12, analysis computing system 2 may receive indications of user input specifying identifiers (e.g., names, addresses, etc. as indicated in area 364) of the one or more system nodes in aviation system 3.

In some examples, a target group has a master system node. A master system node of a target group may control target system nodes of the target group, collect data from target system nodes of the target group, or perform some other special function for target system nodes in the target group. In the example of FIG. 12, a tab corresponding to a selected target group may include UI features for specifying how to communicate with the master system node of the selected target group. For instance, in the example of FIG. 12, tab 360 includes features through which GUI module 8 may receive indications of user input specifying a host name of the master system node (e.g., an IP address of the master system node), a port number to use for communicating with the master system node, a user name for use in authenticating with the master system node, and an authentication type.

In the example of FIG. 12, since a password authentication type is selected, tab 360 includes a password field.

Figure 13:
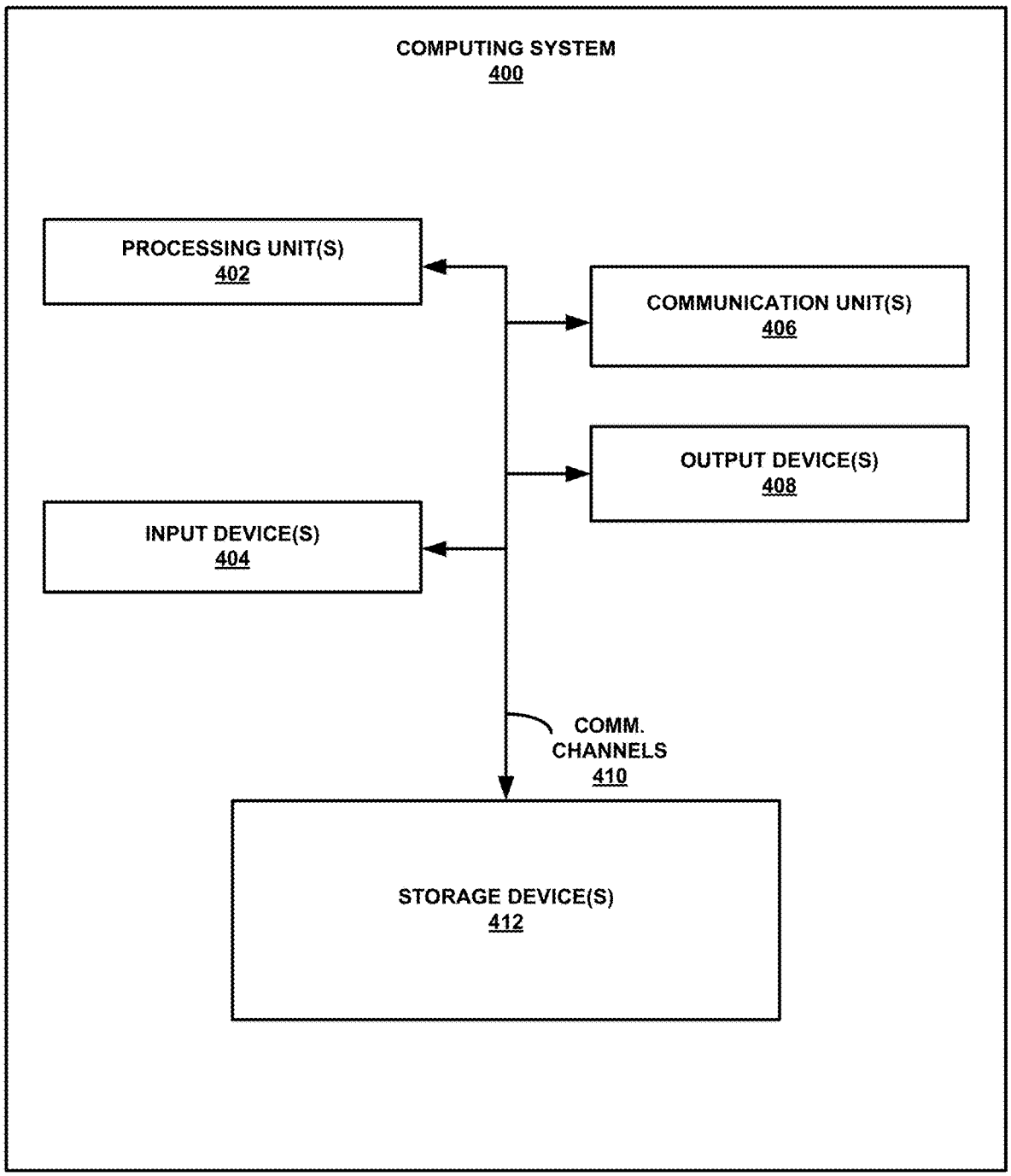
FIG. 13 is a block diagram illustrating further details of an example computing system, in accordance with one or more aspects of the present disclosure.

FIG. 13 is a block diagram illustrating further details of an example computing system 400, such as analysis computing system 2 (FIG. 1) or one or more processing nodes of aviation system 3 (FIG. 1), in accordance with one or more aspects of the present disclosure. FIG. 13 illustrates only one particular example of computing system 400, and many other examples of computing system 400 may be used in other instances and may include a subset of the components shown, or may include additional components not shown, in FIG. 13.

As shown in the example of FIG. 13, computing system 400 includes one or more processing units 402, one or more input devices 404, one or more communication units 406, one or more output devices 408, and one or more storage devices 412. Communication channels 410 may interconnect each of the components 402, 404, 406, 408, and 412 for inter-component communications (physically, communicatively, and/or operatively). In some examples, communication channels 410 may include a system bus, a network connection, an inter-process communication data structure, or any other method for communicating data between hardware and/or software.

One or more input devices 404 of computing system 400 may receive input. Examples of input are tactile, audio, and video input. Examples of input devices 404 include a presence-sensitive screen, touch-sensitive screen, mouse, keyboard, voice responsive system, video camera, microphone or any other type of device for detecting input from a human or machine.

One or more output devices 408 of computing system 400 may generate output. Examples of output are tactile, audio, and video output. Examples of output devices 408 include a presence-sensitive screen, sound card, video graphics adapter card, speaker, cathode ray tube (CRT) monitor, liquid crystal display (LCD), or any other type of device for generating output to a human or machine. Output devices 408 may include display devices such as cathode ray tube (CRT) monitor, liquid crystal display (LCD), or any other type of device for generating tactile, audio, and/or visual output.

One or more communication units 406 of computing system 400 may communicate with one or more other computing systems or devices via one or more networks by transmitting and/or receiving network signals on the one or more networks. Examples of communication units 406 include a network interface card (e.g. such as an Ethernet card), an optical transceiver, a radio frequency transceiver, or any other type of device that can send and/or receive information, such as through a wired or wireless network. Other examples of communication units 406 may include short wave radios, cellular data radios, wireless Ethernet network radios, as well as universal serial bus (USB) controllers.

One or more storage devices 412 within computing system 400 may store information for processing during operation of computing system 400 (e.g., computing system 400 may store data accessed by one or more modules, processes, applications, or the like during execution at computing system 400). In some examples, storage devices 412 on computing system 400 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art. In some cases, storage devices 412 may include redundant array of independent disks (RAID) configurations and one or more solid-state drives (SSD's).

Storage devices 412, in some examples, also include one or more computer-readable storage media. Storage devices 412 may be configured to store larger amounts of information than volatile memory. Storage devices 412 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 412 may store program instructions and/or data associated with one or more software/firmware elements or modules.

For example, when computing system 400 comprises an example of analysis computing system 2 shown in FIG. 2, storage devices 412 may store local knowledge base 16. In addition, storage devices 412 may store instructions and/or data associated with application 5, including, GUI module 8, attack tree module 10, test agents 12, and import/export module 14, shown in FIG. 2. With respect to test agents 12 shown in FIG. 10, storage devices 412 may store instructions and/or data associated with static analysis tools 230, system state monitors 232, active monitors 234, platform configuration test modules 236, and external probes 238. Storage devices 412 may also store attack tree model(s) 18, agent-target data 30, agent-model data 22, test records 24, and group definition data 26.

In other examples, when computing system 400 comprises an example of one or more of computing nodes in aviation system 3, storage devices 412 may store instructions and/or data associated with operating systems 260 (including remote agent/command execution units 262 and system libraries 264), applications 266, and application libraries, as shown in FIG. 10.

Computing system 400 further includes one or more processing units 402 that may implement functionality and/or execute instructions within computing system 400. For example, processing units 402 may receive and execute instructions stored by storage devices 412 that execute the functionality of the elements and/or modules described herein. These instructions executed by processing units 402 may cause computing system 400 to store information within storage devices 412 during program execution. Processing units 402 may also execute instructions of an operating system to perform one or more operations described herein. In those examples in which computing system 400 comprises one or more of system nodes 4, processing units 402 may comprise an example of one or more of hardware components 270 shown in FIG. 10 (e.g., one or more GPUs, one or more FPGAs).

Figure 14:
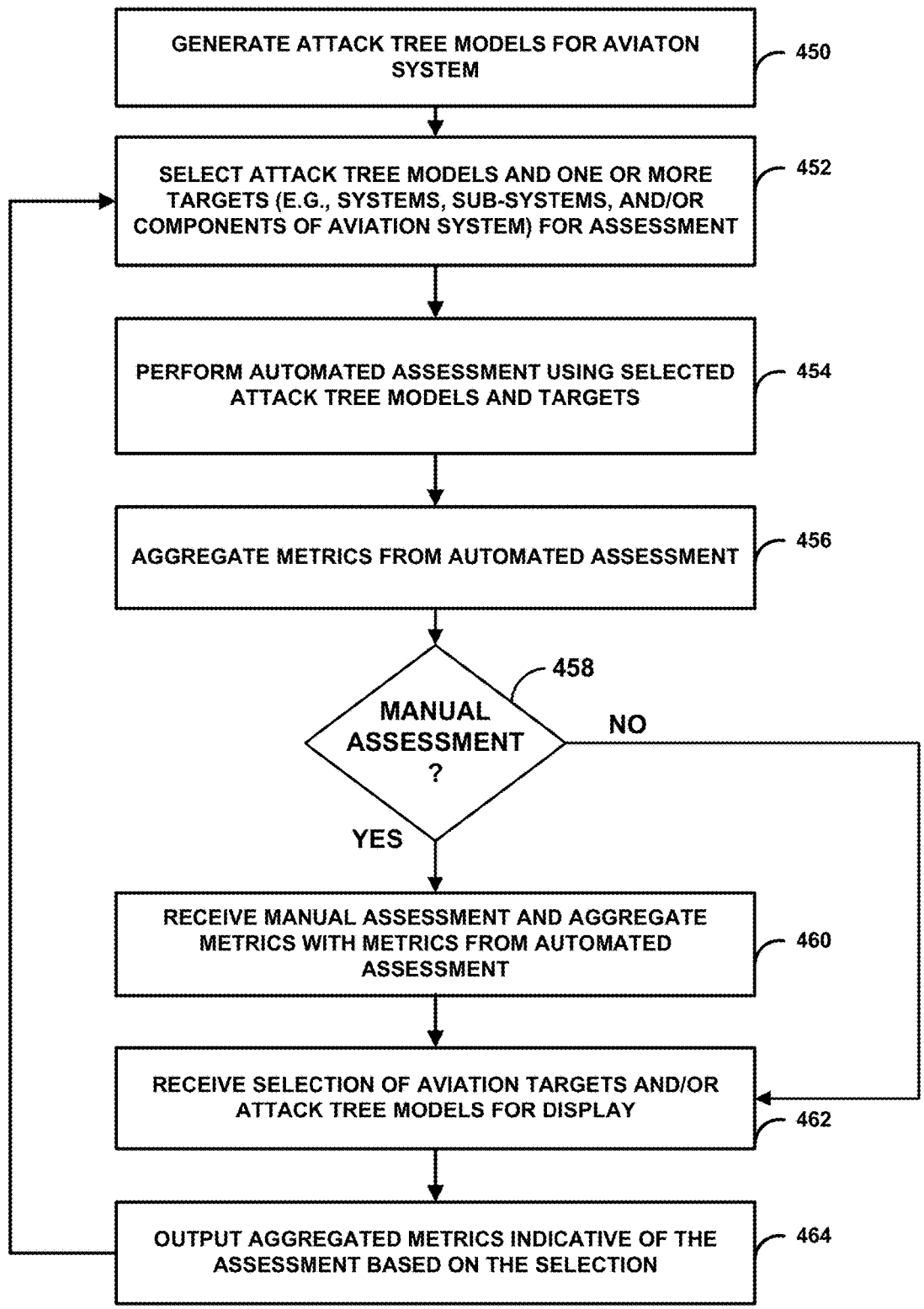
FIG. 14 is a flow diagram illustrating example operations of an analysis computing system in accordance with one or more aspects of the present disclosure.

FIG. 14 is a flow diagram illustrating example operations of analysis computing system 2 when executing application 5 in accordance with one or more aspects of the present disclosure. Analysis computing system may be configured to generate one or more attack tree models for aviation system 3 (450). Generating the attack tree models may include automatic generation of attack tree models, user selection of attack tree models, user assignment of attack tree models to certain system assets (e.g., systems, sub-systems, and/or components of aviation system 3), modification of existing attack tree models, and/or importation of attack tree models.

Analysis computing system 2 may be further configured to select (e.g., automatically or in repose to user input) attack tree model(s) and one or more targets for assessment (452). Analysis computing system 2 may the perform automated assessment using the selected attack tree models and targets (454). In one example, to perform the assessment, analysis computing system 2 may be configured to perform one or more of operational testing, code inspection, requirements testing, automated static analysis, or automated dynamic analysis on one or more of the system, sub-systems, or components of the aviation system.

In one example of the disclosure, at least one of the one or more attack tree models comprises a plurality of tree nodes organized as a tree. For each respective tree node, the respective tree node corresponds to a respective attack goal relating to the aviation system, and for each respective non-leaf tree node, the attack goals corresponding to child tree nodes of the respective non-leaf tree node are preconditions of the attack goal corresponding to the respective non-leaf tree node.

In another example of the disclosure, the one or more attack tree models includes a parameterized attack tree model, wherein the parameterized attack tree model is configured for use with multiple systems, sub-systems, or components of the aviation system. In this example, analysis computing system 2 may be configured to determine first parameters for the parameterized attack tree model for a first system, sub-system, or component of the aviation system, perform a first assessment of the first system, sub-system, or component of the aviation system using the parameterized attack tree model and the first parameters, determine second parameters for the parameterized attack tree model for a second system, sub-system, or component of the aviation system, perform a second assessment of the second system, sub-system, or component of the aviation system using the parameterized attack tree model and second first parameters.

In another example of the disclosure, the one or more attack tree models include a first attack tree model for a first system, sub-system, or component of the aviation system, wherein the one or more attack tree models include a second attack tree model for a second system, sub-system, or component of the aviation system. In this example, analysis computing system 2 may be configured to perform a first assessment of the first system, sub-system, or component of the aviation system using the first attack tree model, perform a second assessment of the second system, sub-system, or component of the aviation system using the second attack tree model, and aggregate outputs of the first assessment and the second assessment.

Analysis computing system 2 may be configured to aggregate all output metrics produced from any of the automated assessments performed (456). In addition, analysis computing system 2 may be configured to prompt and/or allow a user to input data indicative of a manual assessment (458). If a manual assessment is available, analysis computing system 2 may be configured to receive the manual assessment of at least one system, sub-system, or component of the aviation system, and aggregate an output of the manual assessment with output of the first assessment and the second assessment (460). In one example, the manual assessment includes one or more non-technical factors including one or more of staff training hours, physical constraints of staff, or training documentation.

Analysis computing system 2 may be further configured to receive a selection of aviation targets and/or attack tree models for display (462). In response, analysis computing system 2 may be further configured to output aggregated metrics indicative of the assessment based on the selection (464). For example, analysis computing system 2 may generate a user interface that includes a visualization of the metrics, cause display of the user interface on a display device.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processing units (e.g., processors) to retrieve instructions, code and/or data structures for implementation of the techniques described in this disclosure. A computer program product may include a computer-readable medium.

By way of example, and not limitation, such computer-readable storage media can comprise RAM, read-only memory (ROM), EEPROM, compact disc ROM (CD-ROM), or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processing units (e.g., processors), such as one or more digital signal processors (DSP's), general purpose microprocessors, application specific integrated circuits (ASIC's), FPGA's, or other equivalent integrated or discrete logic circuitry. Accordingly, the term "processing unit" or "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses. In some examples, techniques of this disclosure may be performed by processing circuitry, such as one or more microprocessors, microcontrollers, or other types of circuits. In some examples, the processing circuitry read instructions from a memory and execute the instructions, causing the processing circuitry to perform various actions. In some examples, various actions are hardwired into the processing circuitry. Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperable hardware units, including one or more processing units as described above, in conjunction with suitable software and/or firmware.

It is to be recognized that, depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processing units, rather than sequentially.

In some examples, a computer-readable storage medium comprises a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. An apparatus configured to analyze aviation system-level security, the apparatus comprising:
   a memory configured to store data;
   an interface communicatively coupled to the memory, the interface configured to communicatively couple the apparatus to an aviation system; and
   processing circuitry communicatively coupled to the memory and the interface, the processing circuitry configured to:
      generate attack tree models for the aviation system, wherein the aviation system includes a plurality of systems, the plurality of systems including a first system, a second system and a communication services system, wherein the first system is a subsystem of the second system, wherein each attack tree model is associated with a failure of one of the systems included in the plurality of systems, and includes one or more attack vector nodes, each attack vector node defining:
         one or more attack vectors leading to failure of the respective system, from the plurality of systems, that is associated with the respective attack tree model; and
         ways for testing susceptibility of the respective system from the plurality of systems, to the one or more attack vectors of the respective, associated, attack tree model;
      perform an assessment of one or more of the systems included in the plurality of systems of the aviation system using the one or more attack tree models; and
      output, to an output device, a visualization of metrics indicative of the assessment,
   wherein one of the attack tree models comprises a plurality of tree nodes organized as a tree, with a root node of the tree representing failure of the communication services system within the aviation system.

2. The apparatus of claim 1, wherein to perform the assessment the processing circuitry is configured to perform one or more of operational testing, code inspection, requirements testing, automated static analysis, or automated dynamic analysis on one or more of the systems included in the plurality of systems of the aviation system.

3. The apparatus of claim 1, wherein:
   at least one of the attack tree models comprises a plurality of tree nodes organized as a tree, with a root node of the tree representing failure of one system from the plurality of systems within the aviation system, the root node connected to two or more attack vector nodes, and
   wherein each attack vector node includes two or more child nodes, each child node defining a mode for implementing the associated attack vector and ways for testing susceptibility of the respective system from the plurality of systems to the respective attack tree model to such mode.

4. The apparatus of claim 1, wherein the attack tree models include a parameterized attack tree model, and wherein the parameterized attack tree model is configured for use with multiple systems of the aviation system.

5. The apparatus of claim 4, wherein the processing circuitry is further configured to:
   determine first parameters for the parameterized attack tree model for the first system;
   perform an assessment of the first system using the parameterized attack tree model and the first parameters;
   determine second parameters for the parameterized attack tree model for a third system of the aviation system; and
   perform an assessment of the third system using the parameterized attack tree model and the second parameters.

6. The apparatus of claim 1, wherein the attack tree models include a first attack tree model for the first system and a second attack tree model for the second system, and wherein the processing circuitry is further configured to:
   perform an assessment of the first system using the first attack tree model;
   perform an assessment of the second system using the second attack tree model; and
   aggregate outputs of the assessment of the first system and the assessment of the second system.

7. The apparatus of claim 6, wherein the processing circuitry is further configured to:
   receive a manual assessment of at least one system of the aviation system; and
   aggregate an output of the manual assessment with output of the assessment of the first system and the assessment of the second system.

8. The apparatus of claim 7, wherein the manual assessment includes one or more non-technical factors including one or more of staff training hours, physical constraints of staff, or training documentation.

9. The apparatus of claim 1, wherein the processing circuitry is further configured to:
   generate a user interface that includes a visualization of the metrics; and
   cause display of the user interface on a display device.

10. A method of analyzing aviation system-level security, the method comprising:
   generating attack tree models for an aviation system, wherein the aviation system includes a plurality of systems the plurality of systems including a first system, a second system and a communication services system, wherein the first system is a subsystem of the second system, wherein each attack tree model is associated with a failure of one of the systems included in the plurality of systems and one or more attack vector nodes, each attack vector node defining:

one or more attack vectors leading failure of the respective system, from the plurality of systems, that is associated with the respective attack tree model; and ways for testing susceptibility of the respective system from the plurality of systems, to the one or more attack vectors of the respective, associated, attack tree model;

performing an assessment of one or more of the systems included in the plurality of systems of the aviation system using the one or more attack tree models; and outputting, to an output device, a visualization of metrics indicative of the assessment, wherein one of the attack tree models comprises a plurality of tree nodes organized as a tree, with a root node of the tree representing failure of the communication services system within the aviation system.

11. The method of claim 10, wherein performing the assessment comprises:

performing one or more of operational testing, code inspection, requirements testing, automated static analysis, or automated dynamic analysis on one or more of the systems included in the plurality of systems of the aviation system.

12. The method of claim 10, wherein:

at least one of the attack tree models comprises a plurality of tree nodes organized as a tree, with a root node of the tree representing failure of one system from the plurality of systems within the aviation system, the root node connected to two or more attack vector nodes, and wherein each attack vector node includes two or more child nodes, each child node defining a mode for implementing the associated attack vector and ways for testing susceptibility of the respective system from the plurality of systems to the respective attack tree model to such mode.

13. The method of claim 10, wherein the attack tree models include a parameterized attack tree model, wherein the parameterized attack tree model is configured for use with multiple systems of the aviation system.

14. The method of claim 13, further comprising:

determining first parameters for the parameterized attack tree model for the first system;

performing an assessment of the first system using the parameterized attack tree model and the first parameters;

determining second parameters for the parameterized attack tree model for a third system of the aviation system; and performing an assessment of the third system using the parameterized attack tree model and the second parameters.

15. The method of claim 10, wherein the attack tree models include a first attack tree model for the first system and a second attack tree model for the second system, the method further comprising:

performing an assessment of the first system using the first attack tree model;

performing an assessment of the second system using the second attack tree model; and aggregating outputs of the assessment of the first system and the assessment of the second system.

16. The method of claim 15, further comprising:

receiving a manual assessment of at least one system of the aviation system; and aggregating an output of the manual assessment with output of the assessment of the first system and the assessment of the second system.

17. The method of claim 16, wherein the manual assessment includes one or more non-technical factors including one or more of staff training hours, physical constraints of staff, or training documentation.

18. The method of claim 10, further comprising:

generating a user interface that includes a visualization of the metrics; and causing display of the user interface on a display device.

19. A non-transitory computer-readable storage medium storing instructions that, when executed, cause one or more processors to:

generate attack tree models for the aviation system, wherein the aviation system includes a plurality of systems, the plurality of systems including a first system, a second system and a communication services system, wherein the first system is a subsystem of the second system, wherein each attack tree model is associated with a failure of one of the systems from the plurality of systems, and includes one or more attack vector nodes, each attack vector node defining:

one or more attack vectors leading to failure of the respective system, from the plurality of systems, that is associated with the respective attack tree model; and ways for testing susceptibility of the respective system from the plurality of systems, to the one or more attack vectors of the respective, associated, attack tree model;

perform an assessment of one or more of the systems included in the plurality of systems of the aviation system using the attack tree models; and output to an output device, a visualization of metrics indicative of the assessment, wherein one of the attack tree models comprises a plurality of tree nodes organized as a tree, with a root node of the tree representing failure of the communication services system within the aviation system.

20. The non-transitory computer-readable storage medium of claim 19, wherein:

at least one of the attack tree models comprises a plurality of tree nodes organized as a tree, with a root node of the tree representing failure of one system from the plurality of systems within the aviation system, the root node connected to two or more attack vector nodes, and wherein each attack vector node includes two or more child nodes, each child node defining a mode for implementing the associated attack vector and ways for testing susceptibility of the respective system from the plurality of systems to the respective attack tree model to such mode.

* * * * *